United States Patent [19]
MacLaren et al.

[11] Patent Number: 5,484,524
[45] Date of Patent: Jan. 16, 1996

[54] WASTEWATER TREATMENT APPARATUS

[75] Inventors: David S. MacLaren, Gates Mills; Nianfa Tang, Richmond Hts., both of Ohio

[73] Assignee: JET, Inc., Cleveland, Ohio

[21] Appl. No.: 11,866

[22] Filed: Feb. 1, 1993

[51] Int. Cl.$^6$ ........................................... C02F 3/06
[52] U.S. Cl. ..................... 210/151; 210/195.3; 210/219; 261/DIG. 70
[58] Field of Search .................................. 210/615–617, 210/626, 628–630, 195.3, 150, 151, 219, 220; 261/84, 87, 95, 124, DIG. 70

[56] References Cited

U.S. PATENT DOCUMENTS

| | | | |
|---|---|---|---|
| 3,928,199 | 12/1975 | Kirk et al. | 210/63 |
| 3,966,599 | 6/1976 | Burkhead | 210/14 |

(List continued on next page.)

FOREIGN PATENT DOCUMENTS

| | | |
|---|---|---|
| 0134131 | 3/1985 | European Pat. Off. . |
| 142123A | 5/1985 | European Pat. Off. . |
| 201924A | 11/1986 | European Pat. Off. . |
| 301237A | 2/1989 | European Pat. Off. . |
| 478408A | 4/1992 | European Pat. Off. . |
| 2475521 | 8/1981 | France . |
| 2507500 | 12/1982 | France . |
| 2547574 | 12/1984 | France . |
| 2551049 | 3/1985 | France . |
| 2565579 | 12/1985 | France . |
| 2604168 | 3/1988 | France . |
| 2612913 | 9/1988 | France . |
| 3619247 | 12/1987 | Germany . |
| 3715023 | 11/1988 | Germany . |
| 3718191 | 12/1988 | Germany . |
| 3900153 | 7/1989 | Germany . |
| 3813386 | 11/1989 | Germany . |
| 58-104694 | 6/1983 | Japan . |

(List continued on next page.)

OTHER PUBLICATIONS

Rittmann, *Aerobic Biological Treatment*, 1987.
Tanaka, Oshima and Rittmann, *Performance Evaluation of Rotating Biological Contactor Process*, 1987.
NSF International, *Wastewater Technology*, Report on Evaluation of Scienco/FAST Model 23–001–750, Aug. 1992.

(List continued on next page.)

*Primary Examiner*—Thomas Wyse
*Attorney, Agent, or Firm*—Thomas M. Champagne; Jon L. Roberts; Roberts & Associates

[57] ABSTRACT

A wastewater treatment plant for removal of organic matter, suspended solids and other pollutants comprising a pretreatment chamber, a biofilm-aeration chamber and a settling chamber. Biofilm grows on biofilm support structure which is stationary and submerged in the mixed liquor of the biofilm aeration chamber. The combination of submerged or surface aeration and suspended solids particle size reduction occurs thereby creating a sufficient fluid flow within the biofilm aeration chamber. This combination of sufficient fluid flow, and reduced size suspended organic particles results in the efficient digestion of organic matter and pollutants by the biofilm growing on the biofilm support structure submerged in the biofilm aeration chamber. This results in a vastly more effective digestive process than conventional processes producing no sludge. Further, resulting treated effluent has a high dissolved oxygen content and low BOD and SS. The apparatus and process has the following advantages: low MLSS concentration, short biofilm incubation time, no clogging of the system, good response to shock loading, high DO in the effluent, consistent effluent quality, sludge is eliminated, wastewater treatment duration is shortened, the process is not temperature sensitive, plant design is greatly simplified, plants of the present invention are small by comparison to conventional plants, the present invention can be a significant step in the treatment of drinking water, energy consumption during treatment is low, the present invention is very cost effective, the process permits other purification processes to be used and the process is volumetrically and BOD insensitive.

13 Claims, 12 Drawing Sheets

U.S. PATENT DOCUMENTS

| | | | |
|---|---|---|---|
| 3,966,608 | 6/1976 | Mason et al. | 210/151 |
| 3,972,965 | 8/1976 | Higgins | 261/91 |
| 4,263,143 | 4/1981 | Ebner et al. | 210/629 |
| 4,267,052 | 5/1981 | Chang | 210/629 |
| 4,289,626 | 9/1981 | Knopp et al. | 210/616 |
| 4,415,451 | 11/1983 | Suzuki | 210/610 |
| 4,415,454 | 11/1983 | Fuchs | 210/616 |
| 4,505,813 | 3/1985 | Graves | 210/86 |
| 4,540,528 | 9/1985 | Haegeman | 261/91 |
| 4,608,157 | 8/1986 | Graves | 210/86 |
| 4,618,426 | 10/1986 | Mandt | 210/629 |
| 4,663,046 | 5/1987 | Feldkirchner et al. | 210/616 |
| 4,690,764 | 9/1987 | Okumura et al. | 210/629 |
| 4,818,404 | 4/1989 | McDowell | 210/617 |
| 4,844,843 | 7/1989 | Rajendren | 261/30 |
| 4,956,082 | 9/1990 | Choi | 210/150 |
| 5,190,646 | 3/1993 | Hattori et al. | 210/615 |

FOREIGN PATENT DOCUMENTS

| | | |
|---|---|---|
| 60-244394 | 12/1985 | Japan . |
| 3202195 | 9/1991 | Japan . |
| 3267198 | 11/1991 | Japan . |
| 1315129 | 11/1970 | United Kingdom . |
| 1439745 | 5/1973 | United Kingdom . |
| 1498360 | 5/1976 | United Kingdom . |
| 2151497 | 7/1985 | United Kingdom . |
| 9111396 | 8/1991 | WIPO . |
| 9201636 | 2/1992 | WIPO . |

OTHER PUBLICATIONS

Scienco/FAST, *Single Home FAST*, Brochure and Engineering Data, Feb. 1992.

Banerji and CHO, *Evaluation of a Small–Scale Biofilm Process for Wastewater Treatment*, 1991.

Wang et al., *A Study of Simultaneous Organics and Nitrogen Removal By Extended Aeration Submerged Biofilm Process*, 1991.

Scienco, *Industrial Product Data*, Jul. 1986 and Various Scienco/FAST Brochures.

Iwai et al., Design and Operation of Small Wastewater Treatment Plants by the Microbial Film Process, 1990.

Paolini, A. E., *Effect of Biomass on Oxygen Transfer in RBC Systems*, Apr. 1986.

Paolini and Variali, *Kinetic Considerations on the Performance of Activated Sludge Reactors and Rotating Biological Contactors*, Feb. 1982.

Ouyang et al., *Effects of Various Biofilm Processes for Treating High–Aged Landfill Leachate*, Jun. 1991.

Hiavach et al., *Submerged Biological Contactor Full–Scale Demonstration Studies of Operational Characteristics*, Nov. 1990.

Chou et al., *Field Performance of Three RBC Aeration Modes Treating Industrial Wastes*, May 1980.

Backhurst et al., *Rates of Oxygen Transfer Using a Model Surface Aerator*, 1987.

WASTEWATER TREATMENT APPARATUS

RELATIONSHIP TO OTHER APPLICATIONS

This invention is related to an U.S. patent application Ser. No. 08/017,701 concerning the configuration of the wastewater treatment tank filed Dec. 22, 1992.

FIELD OF THE INVENTION

The present invention relates generally to water and wastewater treatment and more specifically to a new process and apparatus for treatment of home, municipal, and biodegradable industrial wastewater. More particularly, the invention relates to the treatment of wastewater utilizing biofilm, sufficient aeration mixing and a means to reduce the particle size of the mixed liquor suspended solids (MLSS).

BACKGROUND OF THE INVENTION

During the late sixties and early seventies the United States, plagued by a rapid deterioration in its water resources, embarked on a program of wide scale improvement of municipal wastewater treatment. That program was designed to maintain the quality of water in rivers and streams and to halt further pollution of those water resources so that they could be enjoyed by generations to come. As part of that program the Environmental Protection Agency (EPA) assisted municipalities by providing them with billions of dollars of aid to improve the technology of municipal wastewater treatment. This aid greatly improved the state of wastewater treatment throughout the United States to the point where many rivers and streams are now undergoing a renaissance in aquatic life and related environments as the quality of the water in the rivers and streams improves. Despite these efforts, a large number of municipal and private wastewater treatment plants still fail to meet EPA pollution discharge permit limits thereby incurring millions of dollars in fines each year. More important, however, is the fact that wastewater pollution continues. For example in the U.S. alone approximately 4.2 million gallons of effluent from septic tanks is released into the ground every minute. This constitutes a significant source of groundwater pollution and disease. Further, this problem is not just in the U.S. but is of worldwide proportions. Additionally, traditional methods of wastewater treatment result in significant amounts of sludge, which must be disposed of by such expensive means as sludge digestors or by disposal in solid waste landfills or land applications, etc. As will be seen from the description below, the present invention solves these problems.

While more wastewater treatment plants are now in operation as a result of government aid, the processes by which municipal wastewater is treated have not been modified significantly in more than 70 years. Thus while many versions of the original processes are in use, they are all generally similar.

The activated sludge treatment process is employed in more than 80% of all treatment plants in the field of home, municipal and biodegradable industry wastewater treatment. That process involves the use of biological agents, free in solution, to digest organic matter that is dissolved or held in suspension in wastewater.

This activated sludge process has several disadvantages. The efficiency of treatment varies widely during the course of any treatment process giving widely varying pollution results. Further, the activated sludge process is temperature sensitive and does not work well in lower temperatures or during periods of rapid temperature change. Additionally, this method results in a large volume of solid waste sludge, which is a significant disposal problem. Consequently, additional land is used for disposal of the sludge thereby increasing the environmental impact of the treatment of municipal wastewater. In the alternative, expensive sludge digestors would have to be employed at tremendous cost to the construction of wastewater treatment plants.

Activated sludge processes focus on settling out as much of the solids as possible while treating the wastewater with biological agents (bacteria) which digest organic matter. "Sludge bulking", which is the most common source of poor solids separation and therefore poor wastewater treatment, occurs when biological solids do not settle rapidly or compact well. (See Rittman, 1987, page 132). This is thought to be due to the growth of filamentous microorganisms which increases resistance to settling and prevent flocculation. Thus smaller particles are a hinderance to rapid settling, and the flocculation of smaller particles into larger ones is important. Also, the time it takes for settling is important, due to the volume of the influent waste water. Good settling means that larger particles are less likely to be carried into subsequent processing steps or tanks.

Wastewater that is being treated in an activated sludge treatment system has a concentration of organic and inorganic matter suspended in the wastewater. This is referred to as mixed liquor suspended solids, or "MLSS". The suspended particles and dissolved organics from the influent wastewater are mixed together in the MLSS. The amount of oxygen required for aerobic bacteria to completely treat the organic matter in the wastewater is referred to as the biochemical oxygen demand or BOD. The quality of wastewater that is released after treatment is measured in part by the amount of suspended solids or "SS" present in solution, usually in milligrams per liter and the level of BOD of the effluent. The EPA has standards for BOD and SS discharge from waste water treatment plants.

In order to remove and lower the SS and BOD, a process which uses biological treatment was developed. This process, known under various names such as attached growth, fixed biofilm, contact oxidation process, has been used for many years to treat wastewater (for review, see Rittman 1987). Biofilm refers to a layer of biologically active organisms or agents which grow on some form of support media and which digest and otherwise breaks down organic matter suspended or dissolved in wastewater. These biological agents grow to the point where they form a layer or "biofilm" over support materials which in turn provide a greater surface area over which those biological agents can grow and operate. The biofilm is spontaneously "inoculated" from microorganisms present in the influent stream and in the air, and, in the conventional biofilm process grows over a period of weeks during the initial start-up of the system.

The biofilm process has been used in a variety of ways. The process has been used in trickling filters, where the biological agents coat small stones and the wastewater is trickled down through the stones; rotating biological contactors where the biological agents coat a moving mechanical support; a filtration sock in an aeration tank in which biological agents grow in the filtration material; and in floating balls in an aeration tank which also have coatings of biological agents.

These techniques offer a number of disadvantages. For example, the filtration sock has frequent clogging and replacement problems which cause this technology to be fairly impractical and expensive. Biofilm coated floating balls have the disadvantage that the biofilm on the surface of the balls cannot be maintained at the required thickness to facilitate optimum digestion of the organic matter and SS. Further, sludge continues to be produced in significant amounts and must be disposed of by other expensive means such as sludge digestion tanks, dewatering process and discarded in land fills and by land application.

As a result of these problems, a new technology of biological contact oxidation was developed. This process utilizes plastic tubes which are placed in an aeration tank and a biofilm is grown on the inside and outside of the tube media.[1] This process therefore combines the activated sludge and biofilm processes. When the BOD concentration is high, greater surface area is required on which biofilm can grow. This requires a smaller tube diameter. However, tube clogging increases as tube diameter decreases; this becomes a significant problem. Thus there is a practical limit to how great a surface area is available for biofilm growth. Tube clogging is further exacerbated when compressed air or surface aeration is used as the aeration source; an increase of biofilm growth causes more rapid tube clogging.

[1] The biofilm is grown from the microorganisms present in the influent stream and in the air.

When tube clogging occurs, the efficiency of the system decreases, until the waste treatment facility must be shut down for cleaning. Once cleaning has occurred, and the system is restarted, there is a lag time of efficient wastewater treatment due to the slow formation of the biofilm. It may take as long as three weeks for a wastewater treatment system to be back in full operation.

Biological contact oxidation technologies utilize a slow circulatory flow and gentle mixing process. Slow circulation and gentle mixing has been used for several reasons. First, slow circulation resulting from gentle mixing is thought to result in greater biological degradation. Second, several types of filamentous microorganisms, which contribute to sludge bulking, have a high affinity for dissolved oxygen. Third, slow circulation in the treatment chamber or compartment discourages solid particle breakdown; this facilitates the settling out of the large particles to remove the particles from the liquor, lowering the SS concentration in the effluent.

Thus the generation of MLSS particles in the conventional processes previously described is generally thought to be undesirable. See Rittmam (1987). While the use of biofilm support structure does increase the surface area and therefore the amount of biological agents able to digest organic matter, the teachings in the art dictate that for a vast majority of treatment processes a gentle fluid flow and larger particle sizes of organic solids are required; both of which cause clogging of the biofilm support structure in use and a significant amount sludge of which must be disposed of by expensive means.

An additional problem with current treatment processes is that dissolved oxygen ("DO") is usually too low in the effluent that is released in the environment or goes on to tertiary treatment. Generally, any aeration of the wastewater does not result in DO concentrations in that treated wastewater sufficient to satisfy EPA requirements. DO is necessary not only for the maintenance of many forms of aquatic life but for other forms of subsequent treatment (re-order). This means that either a re-aeration process must be employed thereby adding time and expense to the treatment process, or else partially treated water is dumped into rivers and streams with a consequent adverse effect on life in those aquatic environments unless expensive tertiary treatment is used. In most locales, the pollution discharge permits issued by EPA require certain DO levels that are not now being met through use of most of the existing technology.

DESCRIPTION OF THE BACKGROUND ART

As previously stated the cell mass that is retained directly or intermittently submerged on a support media on which is attached to various solid surfaces is called "biofilm." (Rittman, 1987.) Efforts to enhance the growth of biofilm have been on going for many years and have been the subject of various developments.

Patent Nos. GB 1498360 to Norton Co. and GB 1439745 to Hydronyl Limited both describe various media from which biological filters can be constructed. These elements provide a large surface area for the growth of biofilm. Another approach to increasing surface area for biofilm growth is described in Patent No. GB 1315129 to Shell International Research Maatschappig BV wherein strands of synthetic organic polymer provide an increased surface area for biofilm growth. Another such development is described in European Patent No. EP 301237 and describes a packing element for a cylindrical filter which provides for a large area for biomass growth.

Another approach focuses on altering the physical contacting of the wastewater and the biofilm. For example, Patent No. GB 2151497 to Klargester Environmental Engineering Limited describes a rotating biological contactor which is essentially a series of cylindrical elements on whose surfaces grow a biomass and which by rotation causes the biomass to come in contact with the wastewater. A similar type of rotating biological contactor is described in the publication of an international patent application under the PCT (Application No. PCT/GB91/01177 to Severn Trent Water Limited). Various other references address either mechanical methods of moving a biomass in contact with wastewater to be treated or having the biomass stationary on some form of biofilm support structure and circulating the wastewater through the biomass. These references do increase the amount of biomass that can come in contact with the fluid to be treated, yet recognize the problem of clogging of the biomass. Further, all result in some form of sludge which must be later removed and which, in small or large part finds its way out of the plant in the effluent resulting in higher BOD and SS.

The notion of having a biofilm constantly submerged in wastewater has also been the subject of research efforts by Wang, et al. (1991) and Iwai (1990). Both of the references discuss wastewater treatment using submerged biofilm and in the case of Wang describe yet another form of biofilm support structure to increase the surface area on which biofilm can grow. Commercial plants having submerged biofilm have also been on the market (Scienco System, Inc.).

This plant is a combination of submerged biofilm and activated sludge processes. The Scienco System is expensive and difficult to maintain. More importantly however is the fact that the Scienco System produces significant amounts of sludge which collects and must be disposed of by the expensive means discussed (above). The Japanese wastewater plants operating at standards well above those specified by the EPA as acceptable in the U.S. Published results show they do not meet such standards. Further these plants are neither cost efficient nor easy to maintain. Additionally, the ability to expand treatment capacity of such plants is impractical.

Aeration means in wastewater treatment has also been the subject of various developments. Some form of aeration has been used in most, if not all, of the processes described herein, since most of the microorganisms require some oxygen. These aeration means have typically been through the use of compressed air feeding into some form of submerged port. However, other mechanical aerators have also been developed for aeration fluids (See U.S. Pat. No. 4,844,843 to Rajendren and U.S. Pat. No. 4,540,528 to Haegeman) In the wastewater treatment field, aeration has been addressed in the literature Banerji et al. (1991) describes the use of subsurface air diffusing means in a submerged biofilm environment. Aeration combined with a biofilm support structure is also described in Patent No. DE 3900-153-A and in Patent No. FR 2551-049-A. Other combinations of aeration and biofilm support structure are also described in Patent No. FR 2565-579-A and others. Thus the modification of some form of aeration together with the biofilm support structure in the presence of the wastewater has been the subject of some development. However, these references still require the settling and removal of sludge.

Another area of development describes submerged mechanical means for moving the fluid to be treated. For example in Patent No. EB-478-408-A, a system is described where a submerged blade is used principally to circulate the fluid horizontally around media holding a biofilm. Patent No. DE 3619-247-A describes aerators which move thereby providing better distribution of aeration throughout a tank. Patent No. DE 3715-023-A describes a aeration system that creates a current in a tank of fluid to be treated. However this particular development does not contemplate the use of submerged biofilm. Patent No. DE 3718-191-A describes a stirring mechanism for a liquid which not only stirs the liquid but also aerates the liquid. However these inventions do not deal with any mechanism for modifying the particle size of suspended solids to be treated and are drawn mostly to aeration and to the circulation of fluids within a tank not to the modification of the contents of the tank.

Thus while certain aspects of the wastewater treatment process have been the subject of various technology developments they have treated the process elements or steps in isolation without really evaluating or developing the interaction of those elements. Furthermore, no one of these developments has dealt with the modification of the physical structure of particles in the wastewater to be treated as does the present invention and which has been found to lead to major enhancements in the wastewater treatment process.

The present invention eliminates all of these disadvantages and uses techniques and technology which is counter to the present conventional wisdom of wastewater treatment, and achieves very favorable results by a treatment process that is vastly more efficient than existing technology.

SUMMARY OF THE INVENTION

The present invention is directed to stationary submerged-biofilm treatment of wastewater together with a mechanical and biochemical process for breaking up suspended solids and organic matter into smaller particles. This process takes place in the presence of aeration sufficient to provide high dissolved oxygen content so that bacteria can rapidly and completely digest the organic matter in the wastewater.

The present invention is based on the discovery that biofilm treatment of wastewater can be greatly enhanced using conditions of substantially higher oxygen transfer efficiency than now exists with either activated sludge or blower plant processes and mechanical disruption and reduction of suspended solids (SS) particle size. Thus the present invention provides for efficient aeration of wastewater in combination with more effective digestion of organic matter which allows enhanced treatment as well as high dissolved oxygen content in the effluent stream. The present invention also provides for both a biological and a mechanical reduction in size of the suspended organic solids which is contrary to established methods of wastewater treatment. This combination results in low levels of SS and biochemical oxygen demand (BOD) in the effluent stream and allows for the significant overall reduction of environmental pollution from municipal, industrial and private wastewater treatment systems.

It is an object of the present invention to provide a process of treating wastewater that utilizes high oxygen transfer efficiency, a reduction in the particle size of the suspended organic solids, and a constantly submerged biofilm. The process of the present invention preferably comprises the steps of: A) aerating the mixed liquor; B) reducing the particle size of the suspended solids in the mixed liquor which may occur before the wastewater enters a biofilm-aeration chamber or after it has entered such chamber; C) creating a fluid flow in the mixed liquor and biofilm support structure; D) growing biomass on the walls of submerged biofilm support structure; E) biomass digestion of the smaller particles of organic matter and dissolved organic matter, with treated water being processed further as needed.

It is a further object of the present invention to provide a biofilm aeration plant for the treatment of wastewater. This plant comprises: A) a pre-treatment chamber wherein organic and inorganic solids are settled out of solution and are degraded physically and biochemically; B) a biofilm-aeration chamber comprising an aeration means, means for reducing the particle size of the suspended organic solids, a biofilm growing on stationary biofilm support structure, which biofilm support structure are constantly submerged in the mixed liquor of the biofilm-aeration chamber, and wherein digestion of organic matter and extreme reduction of suspended solids occurs by combination of the activities of the aeration means, the means for reducing the particle size of the suspended organic solids, and biofilm digestion; and C) a settling chamber wherein remaining solids and biomass are settled out of solution and returned to the biofilm-aeration chamber prior to the highly treated liquid being discharged from the plant.

Because of treatment efficiencies demonstrated to date, it is a further objective of the present invention to greatly simplify the pre-treatment and eliminate settling chambers of conventional processes, in favor of a single biofilm aeration chamber treatment of wastewater.

It is an object of the present invention to reduce the particle size of the suspended organic solids. This may be accomplished by at least one rapidly rotating blade submerged in the mixed liquor. In one preferred embodiment this is accomplished through the use of a rapidly rotating aspirator tip whose rotating arms serve as blades to reduce the particle size. In another alternative embodiment particle size reduction is accomplished via anaerobic digestion of organic matter occurring in a pre-treatment chamber.

It is a further object of the invention to provide sufficient aeration of the wastewater to be treated. This may be accomplished using a subsurface aspirator tip whose hollow arms spin rapidly, causing a pressure differential which draws air down a hollow tube and expels it radially from apertures from the tips of the aspirator. This may also be done by forcing air or oxygen gas through a submerged tube into the mixed liquor resulting in aeration and other means further disclosed.

It is another object of the invention to allow the creation of a sufficient fluid flow by utilizing a combination of aeration means and in certain embodiments mechanical action which is used to reduce particle size.

It is a related object of the invention to provide a biofilm support structure which may have a cross section resembling a square, a rectangle, a circle, an oval, a triangle, an octagon, or a hexagon or any other lattice work which increases the surface area available for biofilm growth.

It is an additional object of the invention to allow for the settling out of suspended solids and biomass after treatment in a biofilm aeration chamber in a settling chamber. A further object of the invention is to provide for the reintroduction of these settled solids and biomass into the biofilm aeration chamber for further treatment.

It is an object of the present invention to provide a simultaneous aeration and reduction in particle size of the suspended particles using at least one aspirator. This aspirator comprises a hollow aspirator tip whose hollow arms protrude radially from a central hollow core. The hollow arms each have an aperture at its end. The hollow aspirator tip is attached to a hollow tube which is exposed to ambient air whereby the low pressure in the rapidly spinning aspirator tip causes air to be drawn by the pressure differential created by the swirling aspirator. Air flows down the hollow tube to the aspirator tip and is expelled radially from the aspirator tip arm apertures. This aspirator provides a simultaneous reduction in the size of the suspended particles through mechanical action as well as aerating the wastewater to be treated.

It is an additional object of the present invention to provide for the facilitation of growth of the biofilm microorganisms. These microorganisms may be a mixture commonly found in traditional biofilm treatments, or they may be novel mixtures of microorganisms whose growth is attributable to better aeration and higher levels of dissolved oxygen. These microorganisms may also be microorganisms specifically introduced into the biofilm aeration chamber by the operator.

DEFINITIONS

Figure 1:
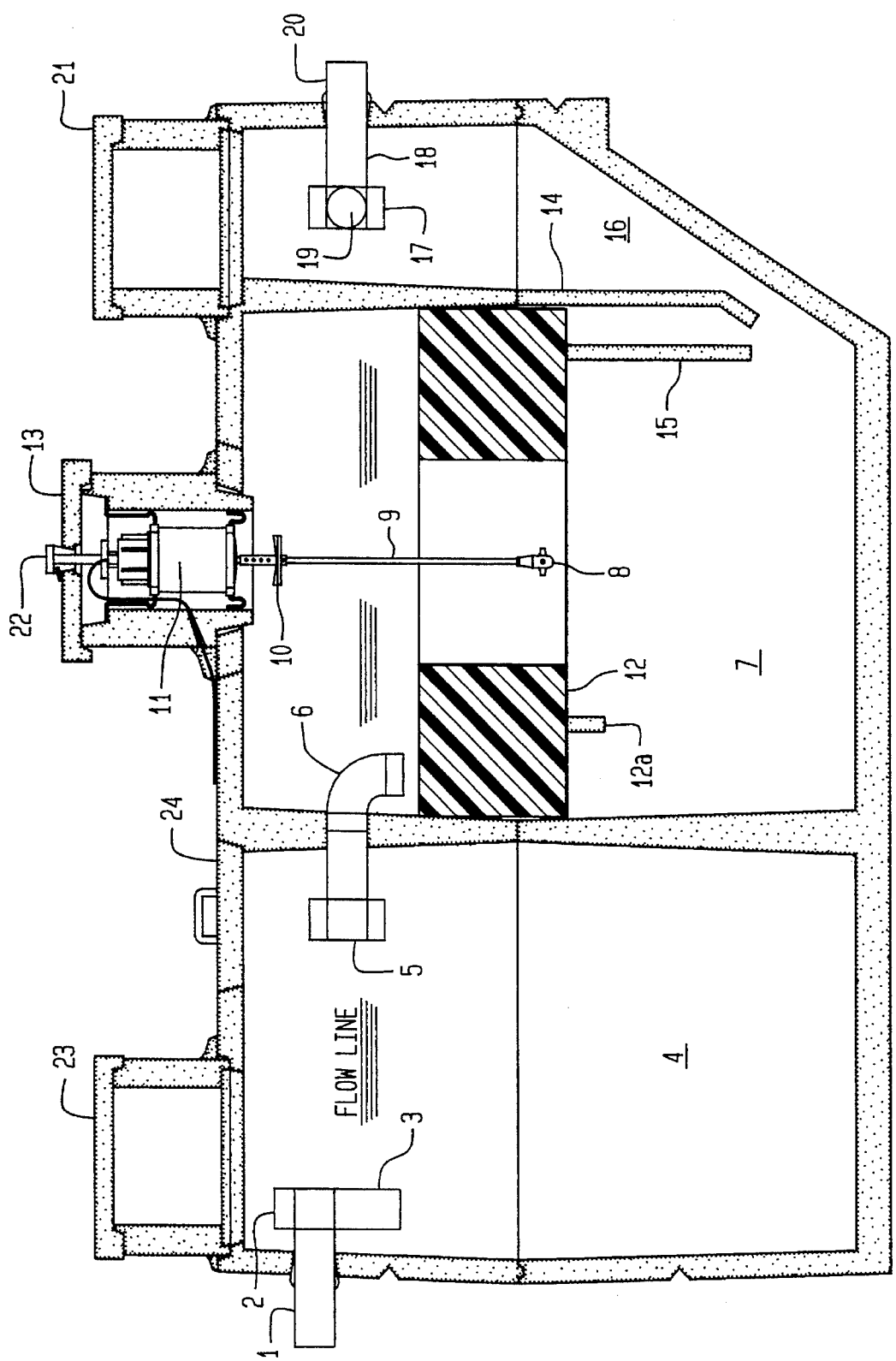
FIG. 1 is a schematic view of the biofilm-aeration plant comprising pre-treatment chamber, biofilm aeration chamber and settling chamber.

By the term "biofilm aeration chamber" or grammatical equivalents herein is meant any chamber which finds use in the present invention. The container may be a tank or vessel and can be either open to the air or covered. The chamber may be a variety of sizes, depending on the flow rate or amount of wastewater to be treated; for example, a tank used for home treatment would be substantially smaller than a municipal treatment plant. The shape or horizontal section of the chamber may vary as needed. The chamber may be made from a variety of materials, such as concrete, PVC, polyethylene, fiberglass, or other materials. The chamber may be designed such that the mechanical means for particle reduction is fixed to one or more of the surfaces of the chamber. Alternatively, the biofilm aeration chamber is designed to allow the insertion of a mechanical means for the reduction in suspended solids particle size. Additionally, the chamber may be so designed as to eliminate the need of a mechanical agitator; for example, the tank may be designed with interior baffles and aeration jets such that the mixed liquor is subjected to agitation sufficient to reduce the particle size of the MLSS and circulate the mixed liquor.

By the term "biofilm" or "biomass" or grammatical equivalents herein is meant the microorganisms which coat the support media. The biofilm is the layer of microorganisms which digest the organic matter in the mixed liquor in the biofilm aeration chamber.

By the term "biofilm support structure" or grammatical equivalents herein is meant any material capable of supporting the growth of microorganisms for this treatment process. It is envisioned that a variety of solid support media will find utility in the present invention. Such supports may be made of plastic, glass, ceramics, metals, rubber, polymers, cellulosic materials, and others. Similarly, it is envisioned that a variety of configurations of the solid support media will find utility in the present invention; a sample of possible configurations are found in FIG. 2, but this is intended to be an example of possibilities and not a finite set. Structures which function as equivalents in the present invention are included in the definition.

The term "reduction in particle size" or grammatical equivalents herein is meant that the particle size of the suspended organic solids is decreased from the size of organic particles first entering the wastewater treatment plant of the present invention as previously stated this particle size reduction may take place either in a pre-treatment chamber via anaerobic digestion or in the biofilm aeration chamber via mechanical means or a combination of these. Generally, there should be a visual reduction in particle size after treatment by the reduction means.

The term "fluid flow," "fluid circulation" or grammatical equivalents herein is meant a flow sufficiently rapid to allow good processing of the mixed liquor and flow through the biofilm support structure. It is envisioned that the fluid flow need not necessarily be uniform within the biofilm aeration chamber, and that ideal flow can vary depending on the physical configuration of the biofilm. For example, if inoculation of the biofilm is done with particularly efficient microorganisms, the fluid flow could be either more or less aggressive than if normal inoculation occurs. Generally the fluid flow will be such that biofilm damage does not occur.

By the term "submerged air pipe" or grammatical equivalents herein is meant a tube that may deliver air or oxygen gas to the wastewater. The tube may contact a submerged surface of the biofilm aeration chamber and may have outlets either spaced periodically along the tube, or a single outlet in one place. Alternatively, the tube may be external to the chamber but have one or more outlets in a surface of the biofilm aeration chamber.

The term "shearing force" is used to describe the force that is applied by the moving aspirator tip arms, other blade means, or other mechanical aeration means, which force is applied to suspended solids in the mixed liquor (wastewater) being treated to mechanically reduce the size of the suspended solids particles.

DETAILED DESCRIPTION OF THE INVENTION

The present invention relates to a method of treating wastewater by using a biofilm in conjunction with suspended particle size reduction and aeration of the wastewater sample to be treated. In particular, the present invention provides a reduction in the average particle size of the MLSS, a biofilm and submerged stationary support structure, and aeration of the mixed liquor.

Detailed Description of the Drawings A description of one preferred embodiment is described by referring to the figures.

Referring to FIG. 1 a side view of a biofilm aeration plant is shown. Influent containing concentrations of pollutants of various kinds enters the pre-treatment chamber 4 through an influent line 1. Influent may be from a variety of sources such as sewage from an individual house or from a municipality. Large organic and inorganic solids that settle out of the influent and for a time remain at the bottom of the pre-treatment chamber 4 where they are acted on physically and biochemically. A sludge layer builds up on the bottom of the pre-treatment chamber as organic matter is broken down by the action of anaerobic bacteria. This action also results in a decrease in organic particle size which particles subsequently flow to the biofilm aeration chamber. Fluid containing suspended solids (reduced in size) and dissolved organic matter exits the pre-treatment chamber through an out flow 5.

The settled liquid is then flowed into the biofilm-aeration chamber 7 from the pre-treatment chamber 4. The biofilm-aeration chamber comprises, in the preferred embodiment, plastic biofilm support structure 12 coated with a biofilm (sometimes referred to as "biomass" or "biological agents" herein) and a submerged mechanical aerator. The liquid is immediately combined with mixed liquor that already is undergoing treatment in the chamber by the swirling action of a hollow aspirator tip 8 which is connected to an electric motor 11 (in this case 3450 RPM) by a hollow shaft 9.

Because of the rotation of an aspirator, a drag force is created at the apertures of the tips and a pressure differential is also produced here. Air is drawn into the hollow aeration tube 9 through the vent cap 22 down to the aspirator tip 8 where the air is injected into the mixed liquor as tiny bubbles. Rapid mixing of the tiny bubbles occurs once they emerge from the tips of the aspirator 8. High oxygen transfer is accomplished by this high speed mechanical rotation and air injection process.

The submerged aspirator tip 8 rotates at speeds sufficient to reduce the average particle size of the mixed liquor suspended solids (MLSS) into much reduced-size particles. It has been found that aspirator arm tip speeds of 20 ft/sec and higher are effective for performing the particle size reduction function. The swirling motion created by the aspirator tip together with the lifting motion of the air injected into the mixed liquor circulates the smaller organic particles through the plastic biofilm support structure 12 on which the biofilm is growing.

Circulation of the mixed liquor is created in the biofilm aeration chamber by the swirling motion of the aspirator tip 8 and by virtue of air that is injected into the mixed liquor radially from the hollow aspirator tip, which produces the fluid flow.

The amount and physical configuration of biofilm support structure present in the process is important. Too much biofilm support structure with too narrow a diameter/aperture would be easily susceptible to clogging. Too little biofilm could result in insufficient treatment. It has been found that a volume of biofilm of between 10% and 99% of the total volume of the biofilm aeration tank provides an effective treatment of wastewater with the combination of other elements of the present invention. Further, the diameter of the apertures of the biofilm is also critical since apertures which are too small will clog easily as biofilm grows. It has been found that apertures of ½" and larger are satisfactory diameters for use in the present invention.

The mixed liquor passes through the biofilm coated tubes due to fluid flow generated by the rapidly rotating aspirator. The small MLSS particles and dissolved organic matter are readily adsorbed onto the surface of the biofilm which is growing on the tube walls. The microorganisms of the biofilm are in an oxygen-rich, nutrient-rich environment, and the organic matter and pollutants are digested by the biomass. Thus the mixed liquor is purified by this digestive action of the biofilm.

Any large particles of organic material that remain undigested by the biofilm and any old pieces of biofilm which may slough off the interior of the biofilm tube walls fall into the mixed liquor and again are immediately reduced in size by the rapidly moving aspirator tips. The resulting biofilm particles and organic matter are again circulated through the biofilm tubes where biological digestion continues. The resultant suspended solids from this process is extremely low and is therefore totally different from the various biological digestion processes now in use.

While most of the fluid flow circulates in the biofilm aeration chamber 7, as the volume of fluid in the biofilm aeration chamber increases as a result of continuing influent some of the fluid that has been treated flows or is displaced through a gap between wall 14 and baffle 15 into the settling chamber 16. Any settled solids in the settling chamber 16, which might consist of small pieces of biofilm or suspended solids that are not small enough, are returned to the biofilm aeration chamber 7 by a circulation force created by the circulation current in the biofilm aeration chamber.

One embodiment of the present invention accomplishes this circulation force using tank configuration. Walls 14 and 15 of FIG. 1 are installed in parallel. Wall 14 is created so that a relatively higher velocity fluid flow constantly moves down the wall of the biofilm aeration chamber circulating fluid back into the chamber thus "drawing" settled solids from the settling chamber 16 back into the biofilm aeration chamber 7 for further treatment. While the exact configuration of the walls may vary, any configuration which allows recirculation of fluid and settled particles in the biofilm aeration chamber for purposes of particle reduction and digestion may be used.

The supernatant in the settling chamber 16 is collected and flows out through an effluent pipe 20.

Figure 2:
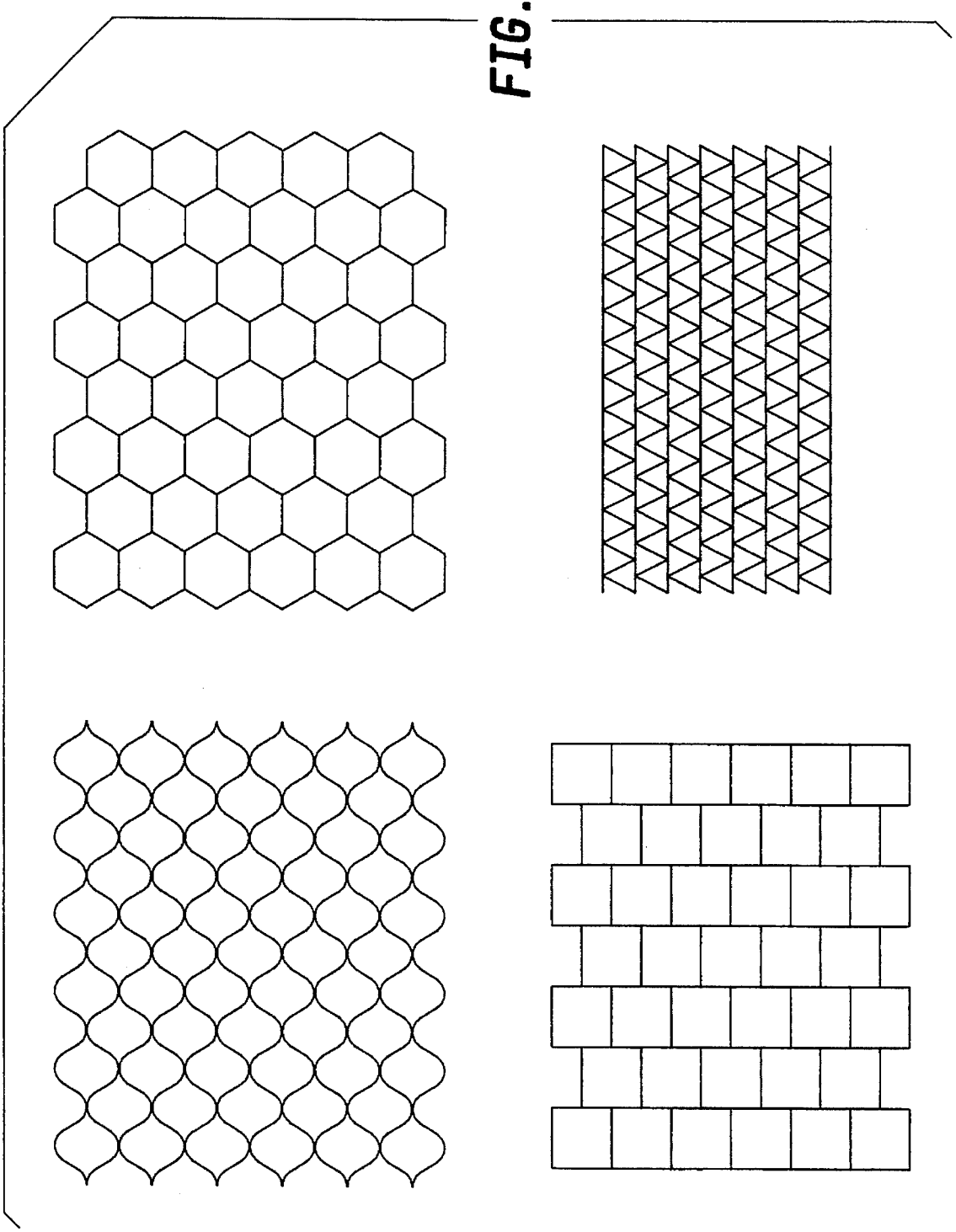
FIG. 2 is a top view of a few of the different vertical plastic media on which biofilm can grow.

Referring to FIG. 2, a top view of the biofilm support structure embodiments is shown. The exact configuration of the biofilm can widely vary yet still be effective with the present invention. The main requirement is for the media to provide increased surface area in the biofilm aeration chamber on which biological agents, or biomass can grow, and therefore digest suspended organic particles. The diameter of the aperture of the biofilm must also be large enough for the normal life cycle of biofilm (i.e. growth, sloughing off) so that the biofilm support structure tubes will not clog as the biofilm grows, sloughs off the walls of the tubes and falls to the bottom of the chamber for further particle size reductions. ½" diameter and larger is satisfactory for use with the present invention.

Figure 3:
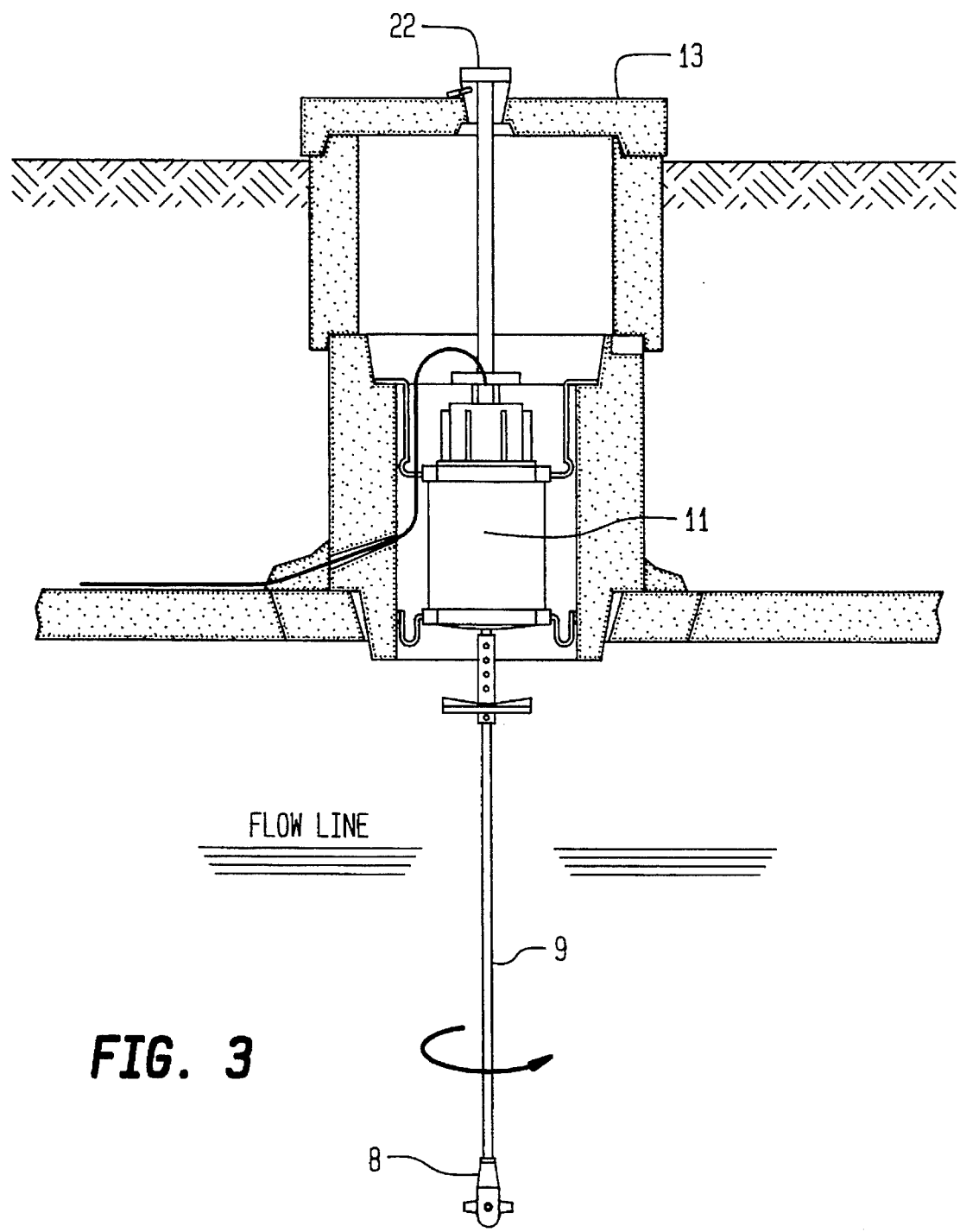
FIG. 3 is a schematic view of the aerator of the present invention.

Referring to FIG. 3 the aerator is described. The aerator comprises an electric motor 11 which rotates at 3450 rpm. It further comprises a vent cap whereby air from the outside is drawn into the hollow aerator shaft 9. The present invention comprises an aspirator 8 with four arms each of which has an aperture at the tip of each arm. However other configurations of aspirator tips are possible. It is also envisioned that a multitude of different tip shapes will find use in the present invention. It has been found that arm tip speeds in excess of 20 ft/sec are appropriate to reduce the particle size reduction.

Figure 4:
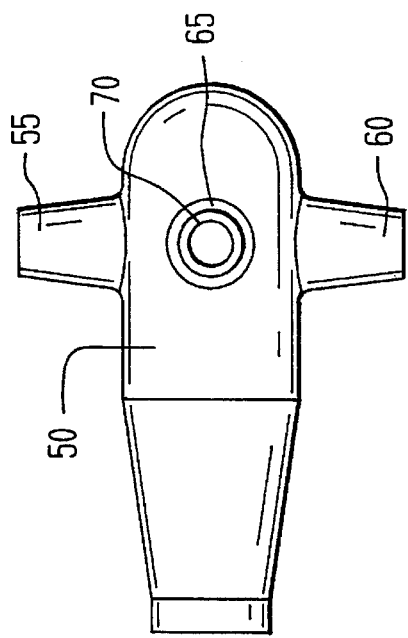
FIG. 4 is a side view of the aeration tip.

Referring to FIG. 4 a side view of the aspirator is shown. The aspirator tip 50 is a hollow component with arms 55, 60, 65 protruding from the hollow core of the aspirator. Each aspirator arm in turn is hollow and has a small aperture 70 from which air emerges.

Figure 5:
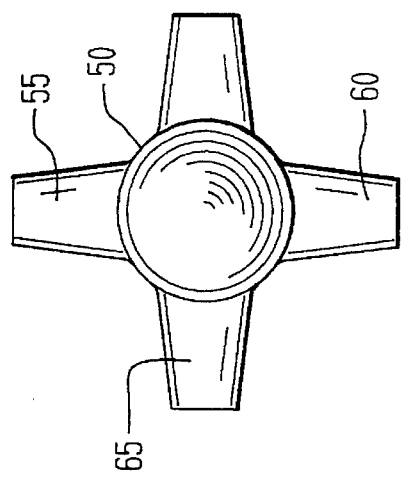
FIG. 5 is a bottom view of the aeration tip.

FIG. 5 is a bottom view of the aspirator showing the arms 55, 60, 65 through which air emerges.

Figure 6:
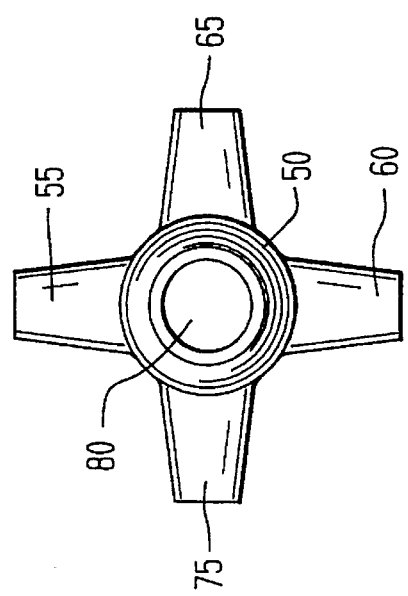
FIG. 6 is a top view (cut away) of the aeration tip.

FIG. 6 is a top view (cut away) of the aspirator 50. Aspirator tip arms 55, 60, 65, 75 are shown. A shaft leading to the aspirator is hollow with an opening 80 through which air is pulled during the high speed rotation of the aspirator tip.

Figure 7:
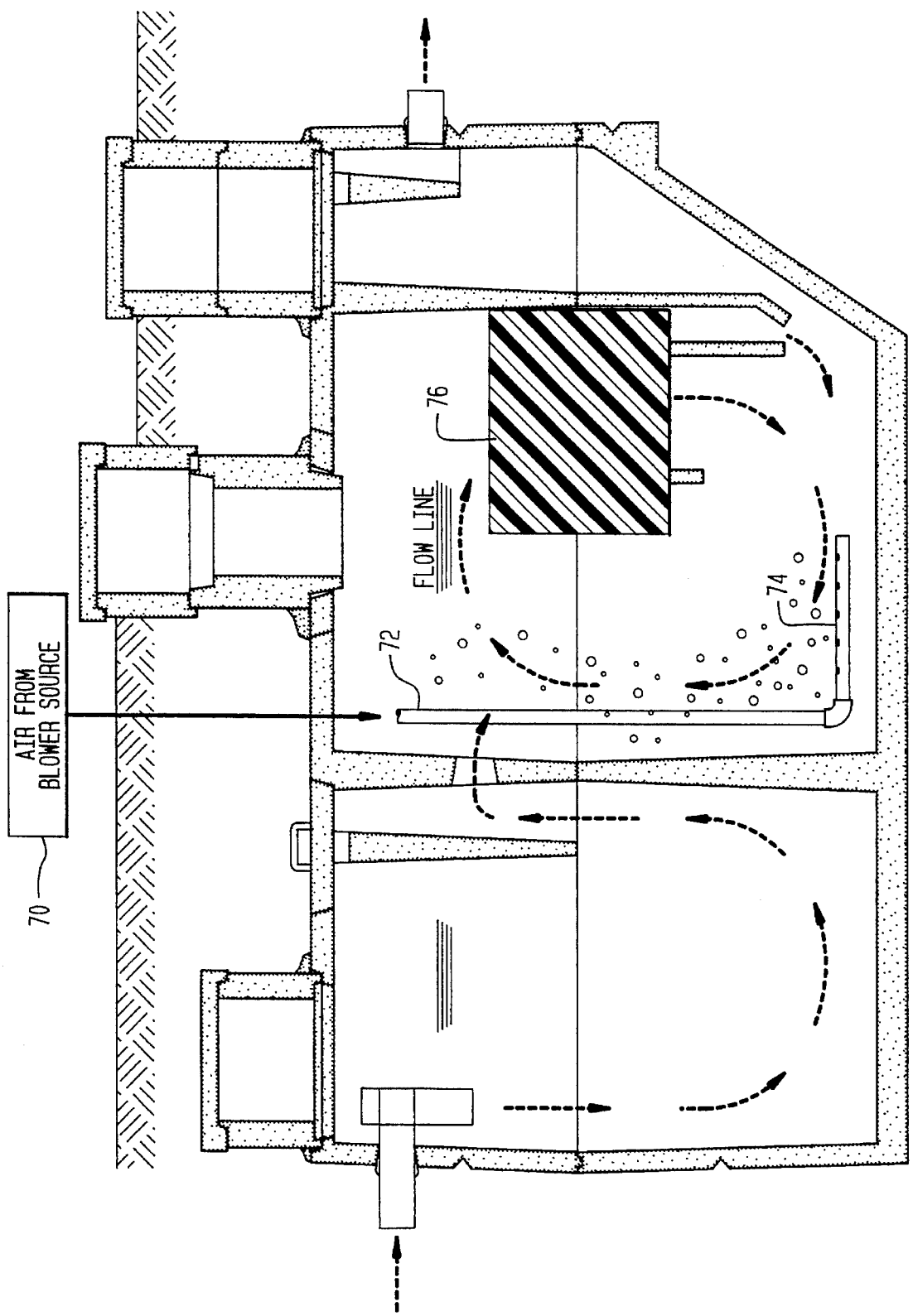
FIG. 7 is a side view of Blower/Biofilm embodiment of the present invention.

Referring to FIG. 7 the blower-biofilm embodiment of the present invention is shown. Air from a blower source 70 is forced into a tube 72 and out a lower diffuser 74 having openings for release of air into the biofilm aeration chamber. This diffuser comprises at least one pipe with holes for release of air and usually comprises a network of such pipes. These structures are known as tubular diffusers. This forced air results in bubbles which rise to the surface creating a circular flow pattern in the biofilm aeration chamber (indicated by the dashed arrows). The wastewater being treated then circulates through the biofilm support structure 76 where it is acted upon as previously described by the biofilm growing on the support media. It should be noted that the location of the blower tube can vary within the tank so long as an appropriate flow is created through the biofilm support structure of the wastewater being treated.

Figure 8:
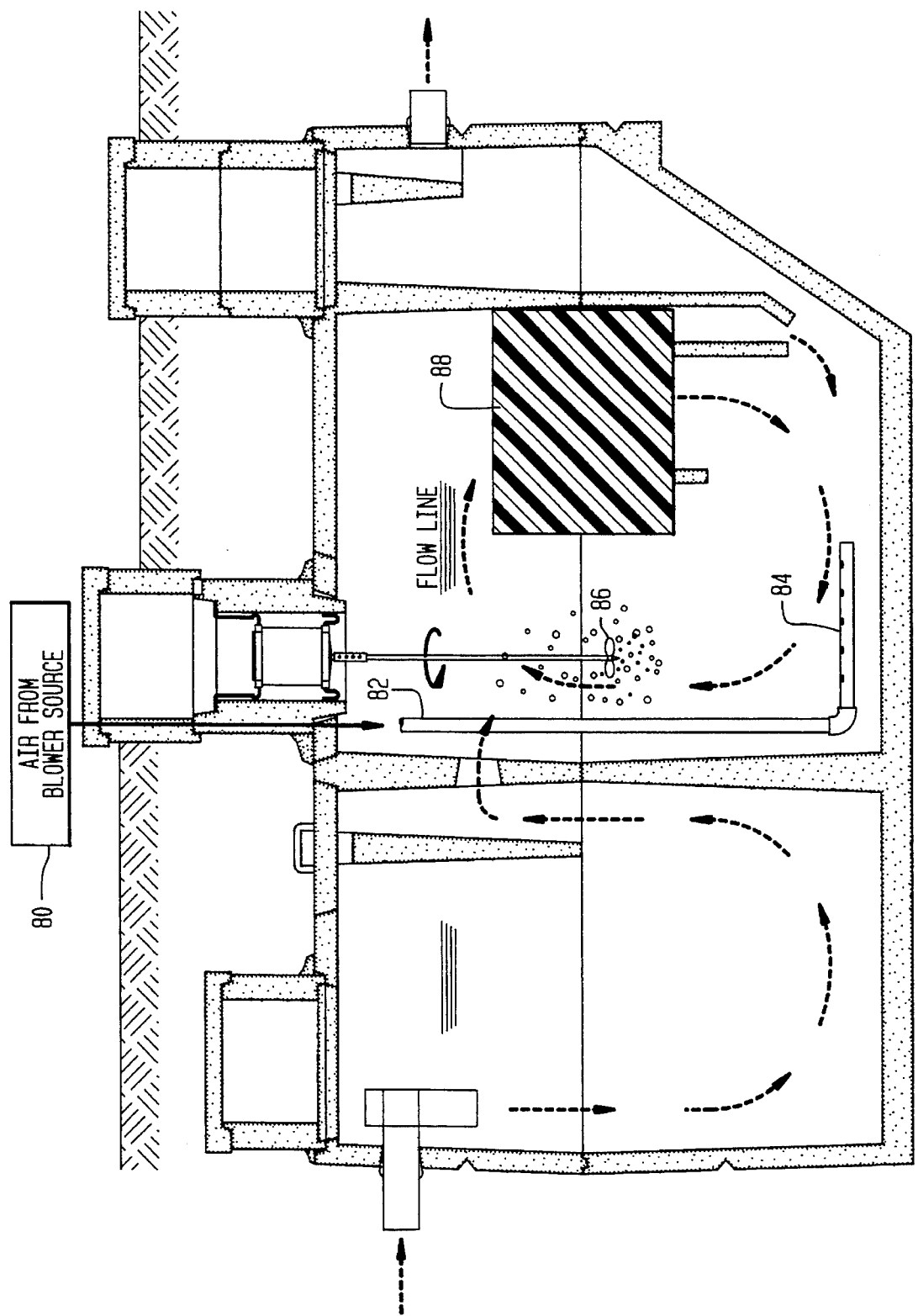
FIG. 8 is a side view of the Blower-Mixer-Biofilm embodiment of the present invention.

Referring to FIG. 8 a sideview of a blower-mixer-biofilm plant is shown. In this embodiment of the present invention air from a blower source 80 is forced into a air pipe 82 and out openings of the tubular defuser 84. This creates an upward flow of bubbles which induces an overall circular motion of the wastewater being treated in the biofilm aeration chamber. A mixing means 86 is also employed in this embodiment to further reduce the particle size by physical action of the rapidly rotating mixer. This mixer may be a blade mixing means, propeller type mixing means or other rapidly moving mixing means. The wastewater being treated then flows through biofilm support structure 88 where it is acted upon by the biofilm growing thereon. The fluid flow within the biofilm aeration chamber is indicated in this figure by the dotted arrows. In this fashion the constant circulation of the aerated and mixed wastewater is created in the tank and constantly circulated through the biofilm.

Figure 9:
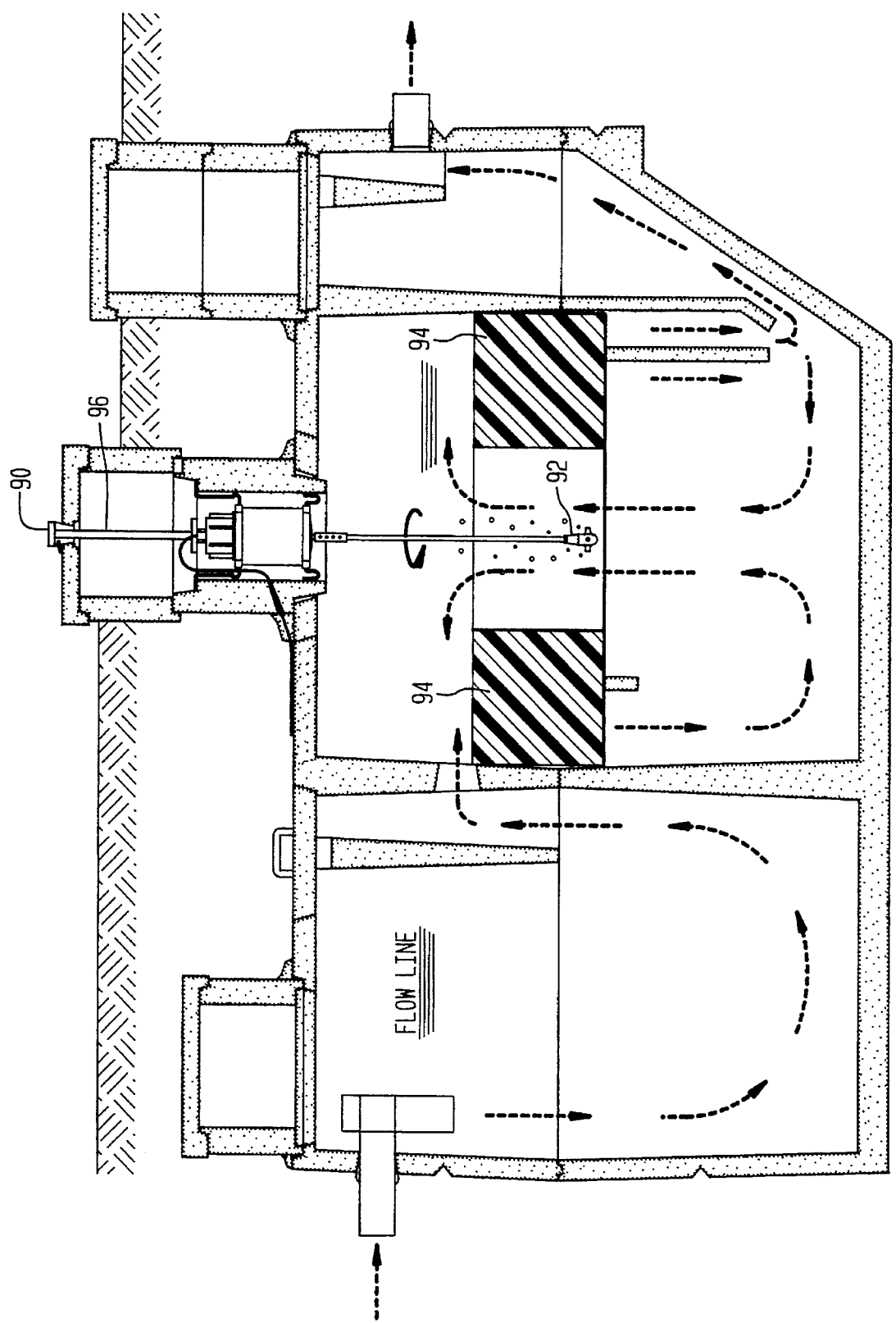
FIG. 9 is a side view of the Aerator-Biofilm embodiment of the present invention.

Referring to FIG. 9 the aerator-biofilm embodiment of the present invention is shown. In this embodiment (previously described in FIG. 1) a spinning aspirator 92 is placed in the wastewater being treated. The spinning aspirator creates a pressure differential which results in air being pulled down an air tube 96 which is open to the ambient air at opening 90. The air then descends to the aspirator tip where it is expelled, the resulting bubbles creating a flow through the biofilm aeration chamber indicated by the dotted arrows. The wastewater being treated then flows through the biofilm support structure 94 where it is acted upon by the biofilm growing thereon. In this particular embodiment the spinning aerator may be an aspirator or a blade or equivalent mechanical aeration means. This action also results in both aeration as well as particle size reduction.

Figure 10:
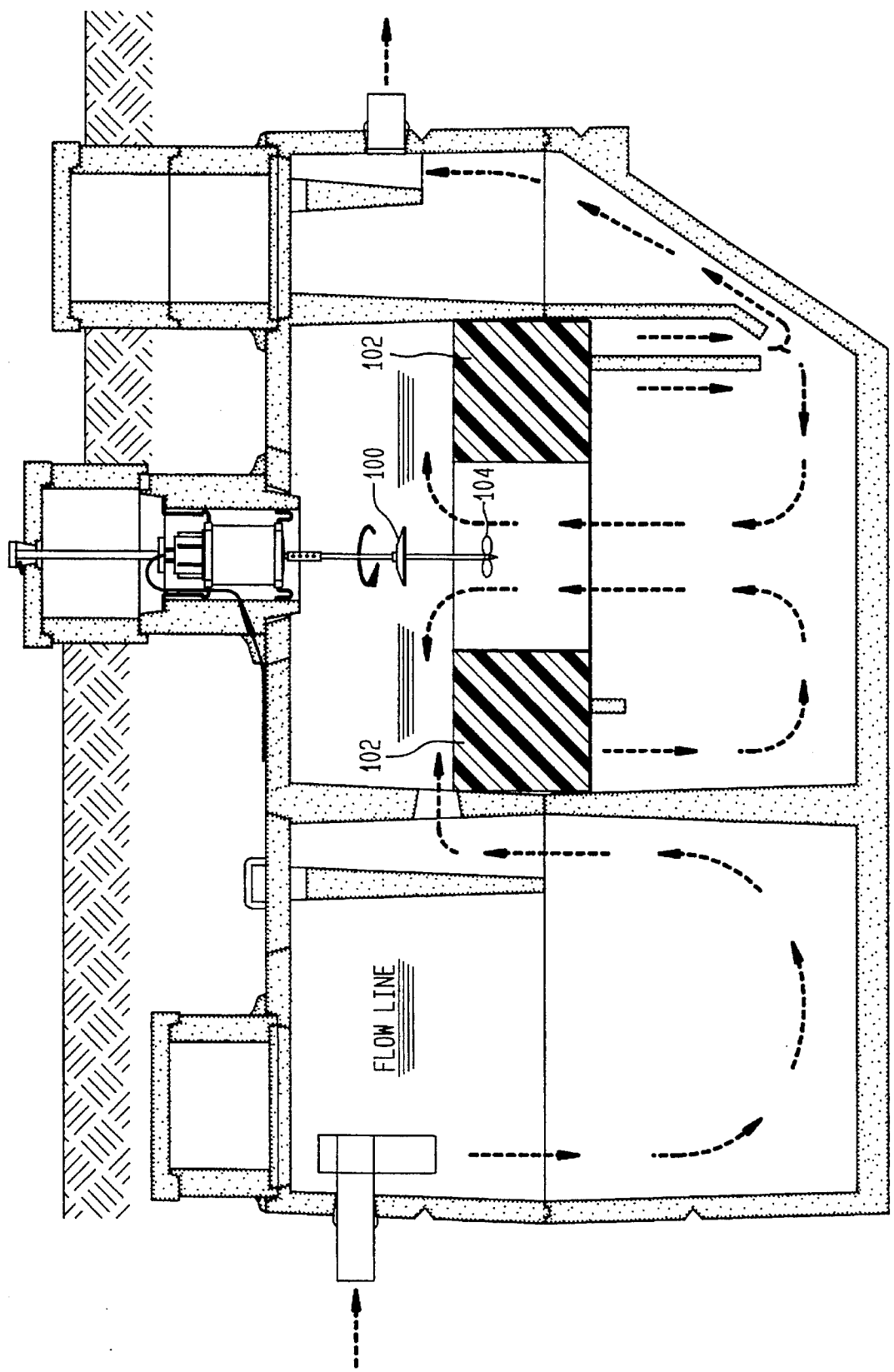
FIG. 10 is a side view of the surface aerator embodiment of the present invention.

Referring to FIG. 10, the surface aerator embodiment of the present invention is shown. A rapidly spinning aerator 100 and propeller 104 in the biofilm aeration chamber lifts the wastewater and aerates it and reduces the size of organic particles in the wastewater via the mechanical action of the surface aerator. The action of the surface aerator creates a fluid circulation in the chamber such that the wastewater being treated flows through the biofilm support structure 102 where it is acted upon by the biofilm. In this embodiment, the surface aerator may be at or just below the water level at the top of the biofilm aeration chamber. Again dotted arrows show the circulation pattern in the chamber.

Figure 11:
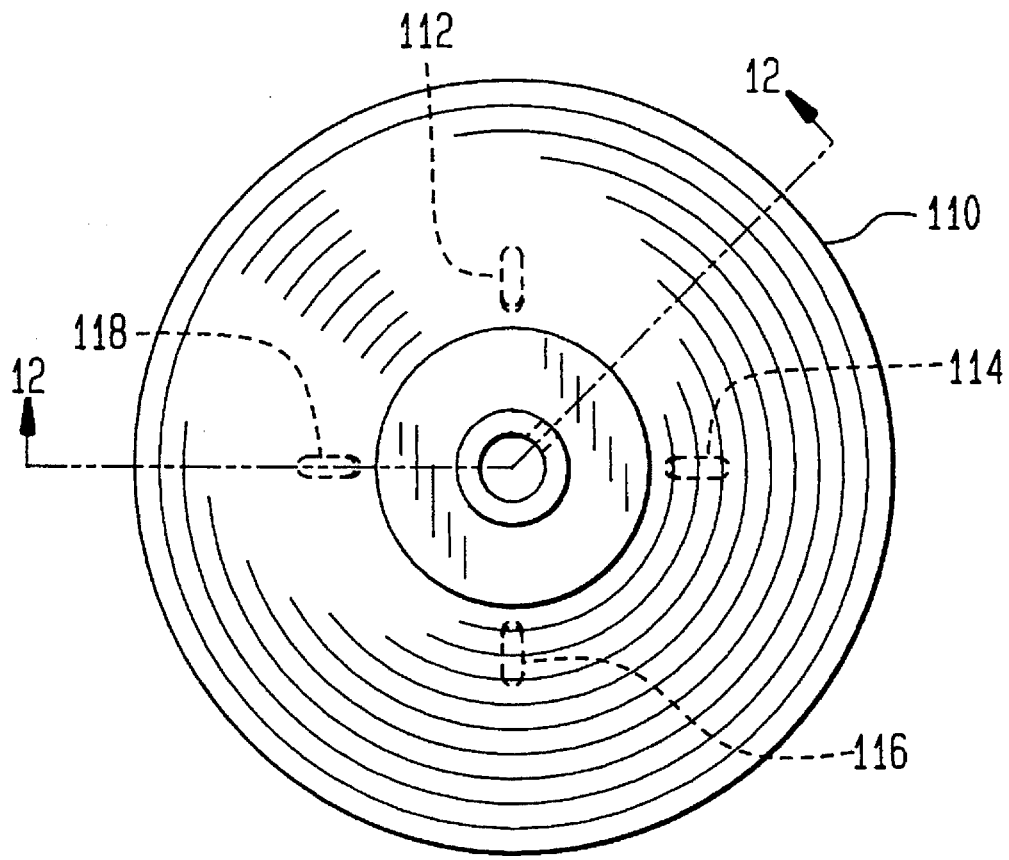
FIG. 11 is a top view of the surface aerator.

Referring to FIG. 11 a top view of the surface aerator is shown. The surface aerator comprises a disk 110 with blades which are punched from the disk and bent downward to come in contact with the wastewater. These blades 112, 114, 116, 118, may be formed from the disk or be separate members attached to the underside of the disk. As the aerator spins, the blades beat the wastewater reducing particle size and spreading and mixing wastewater throughout the biofilm aeration chamber aerating the wastewater.

Figure 12:
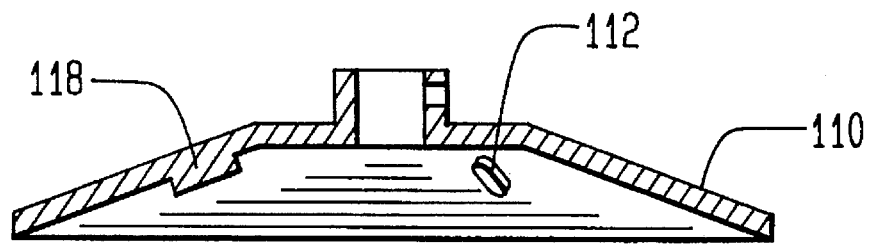
FIG. 12 is a side view of the surface aerator.

Referring to FIG. 12 a side view of the surface aerator is shown. The surface aerator disk 110 is shown in profile together with two of the four blades of the current embodiment 114, 118.

Figure 13:
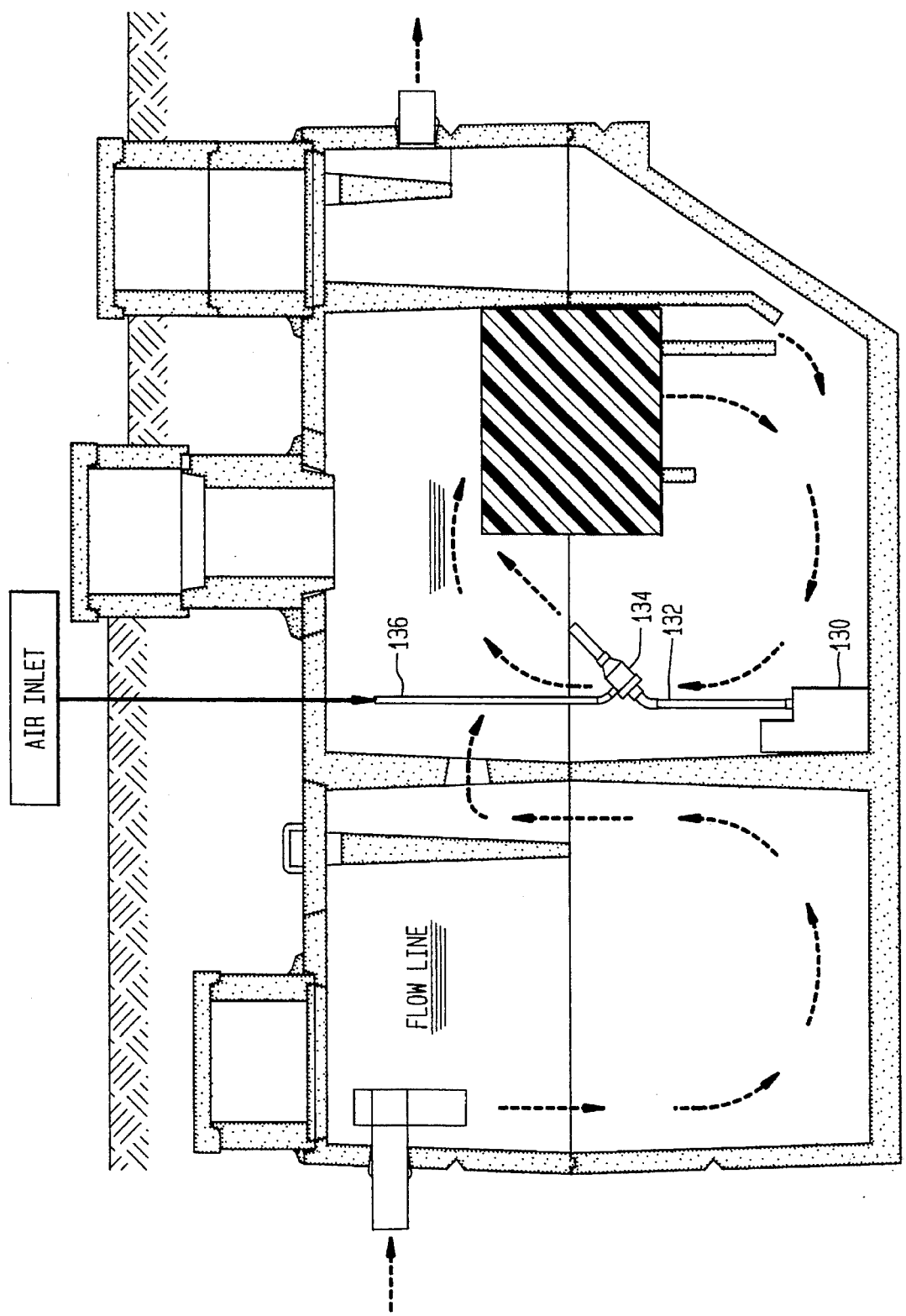
FIG. 13 is a side view of the venturi-biofilm embodiment of the present invention.

Referring to FIG. 13 a side view of the venturi-biofilm embodiment of the present invention is shown. This embodiment comprises a pump 130 which draws in wastewater which is then pumped up a tube 132 to a venturi head 134. The relatively high velocity of the wastewater in the venturi head 134 creates a low pressure environment. The venturi head is in turn attached to an air pipe 136 which is exposed to the ambient air. The low pressure environment in the venturi head 134 draws air down the air pipe 136 where it is expelled from the venturi head together with the wastewater being pumped. In this fashion both mixing and aeration of the wastewater occurs simultaneously in the venturi head 134 prior to its expulsion from the head. This entire action sets up a fluid flow as indicated by the dotted arrows in FIG. 13. In this fashion aerated wastewater is circulated through the biofilm support structure where it is treated. All other actions of the present embodiment function in the same fashion as previously described.

Figure 14:
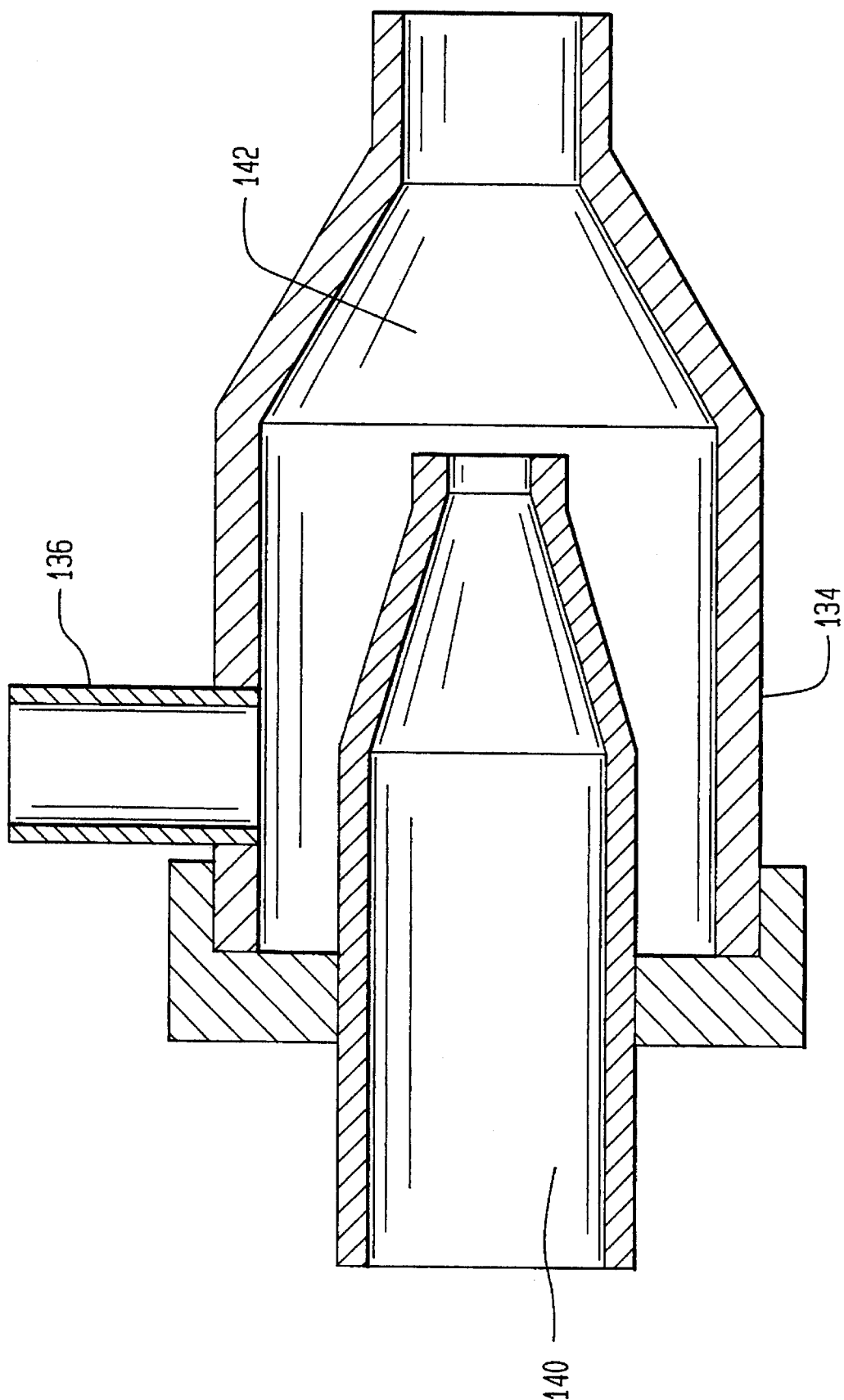
FIG. 14 is a side view (cut away) of the venturi assembly of the venturi-biofilm embodiment of the present invention.

Referring to FIG. 14 a side view (cut-away) of the venturi head is shown. The venturi head 134 comprises a first nozzle 140 which receives the wastewater pumped from the venturi pump (not shown). The nozzle causes the wastewater being pumped to have a high velocity as it is admitted into a second nozzle 142. This high velocity creates a low pressure area. Air is drawn down air pipe 136 by virtue of this low pressure environment and expelled from the second nozzle 142 after it is mixed with the wastewater being pumped from the first nozzle 140.

Figure 15:
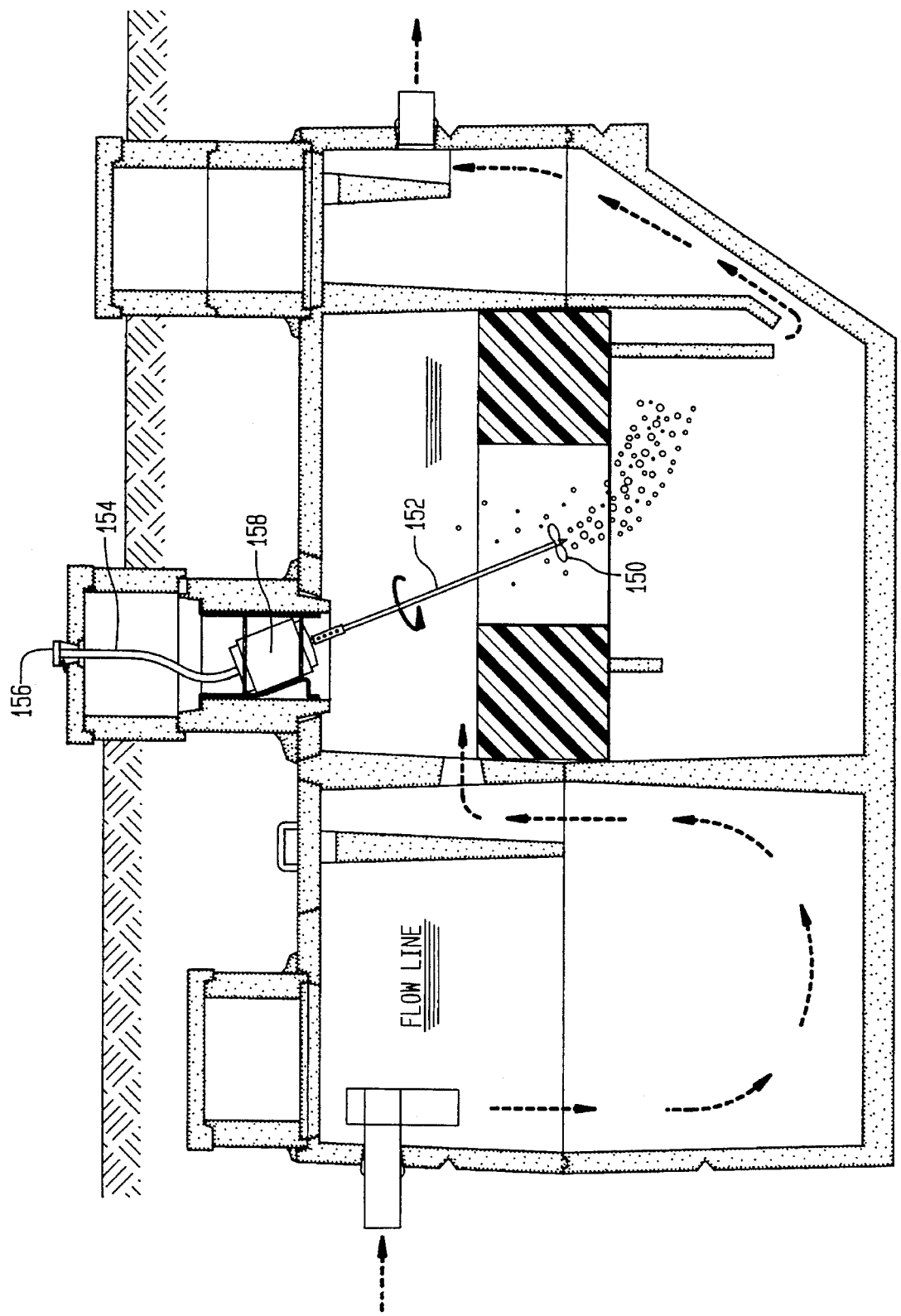
FIG. 15 is a side view of the tubular aerator-biofilm embodiment of the present invention.

Referring to FIG. 15 a side view of the tubular aerator-biofilm embodiment of the present invention is shown. A rapidly spinning propeller 150 spins at the bottom of a hollow tube 152 which is spun by high speed motor 158. A hollow tube is connected to the ambient air by an air tube 154 ending in an aperture 156 exposed to the ambient air. The high speed motion of the propeller 150 causes a low pressure environment. Air is drawn down the hollow tube 152 after being drawn into the air tube 154 through the aperture 156. The combined motion of the propeller 150 and the air causes an aeration and circulation to take place within the biofilm aeration chamber.

Alternative Embodiments

In a preferred embodiment, the wastewater is mixed with and diluted by "mixed liquor", which is wastewater that has been treated and is in the process of being treated by the present invention; thus the present invention can be used in a "continuous mode." This method will find particular utility in the treatment of community municipal wastewater or as a significant step in the treatment of drinking water.

In an alternative embodiment, the wastewater is not diluted nor mixed with any previously treated water; thus the present invention can also be used in a "batch mode".

In a preferred embodiment, the support media is plastic. In alternative embodiments, the support media is any compound upon which the biofilm will grow. It is envisioned that a variety of support materials will serve as equivalents and will find utility in the present invention. Such supports may be made of glass, ceramics, metals, rubber, polymers, cellulosic materials, and others.

It is envisioned that a variety of configurations of the system will function as equivalents in the present invention. For example, in a preferred embodiment the mechanical aerator is submerged in the wastewater to be treated by the present invention. When used in this manner, the mechanical aerator serves to aerate the mixed liquor as well as reduce the particle size.

In a preferred embodiment, the mechanical aerator comprises a high speed electric motor coupled to a hollow shaft with an aspirator tip mounted on the end of the shaft. The aspirator tip and part of the shaft are submerged in the mixed liquor, and are rotated at high speeds by the electric motor. This accomplishes two different functions. First, a pressure differential is produced by the spinning of the hollow aspirator tip which draws air in from an intake on the top of the hollow shaft. This air is drawn down through the hollow shaft to the aspirator tip where it is injected into the mixed liquor. The bubbles in this present invention may vary in size yet still allow the invention to perform the aeration process however, the smaller the better. The bubbles produced are dispersed radially into the mixed liquor introducing oxygen into the mixed liquor. This oxygen increases the efficiency and the activity of the biofilm and increases the DO in the mixed liquor. The aerated mixed liquor then flows through the plastic tubes of the biofilm support structure by the rapid circulation current. This circulation current is created by the dual action of the rotating aspirator and the rising bubbles of air, which increases the lifting effectiveness of the fluid flow. Second, the rapidly rotating arms of the aspirator also mechanically reduces the size of the organic particles.

In alternative embodiments, the aspirator and shaft are configured such that large volumes of air may be introduced into the mixed liquor. For example, a compressor may introduce air through a hose or tube to the aspirator.

In alternative embodiments the functions of aeration and reduction of particle size may be accomplished using separate means. For example, the aeration means may be embedded in a surface or surfaces of the aeration chamber, and a mechanical blade or blades may serve as the means for reducing the average particle size of the MLSS.

Alternatively, a submerged air pipe and diffuser system may serve as the aeration means. This tube may be fixed to a submerged surface of the biofilm aeration chamber, with either a series of air outlets, a single air outlet, or a network of tubular diffusers. The tube may be external to the biofilm aeration chamber but have an outlet or outlets in a submerged surface of the chamber.

Alternatively, the tank itself may be constructed such that a directed aeration stream will result in sufficient fluid flow; the tank may have internal baffles, for instance.

In an alternative embodiment, the surface aerator may be located at the top of the biofilm aeration chamber just below the surface of the mixed liquor. Aerator and particle size reduction occurs in the fashion already described albeit at the top the biofilm aeration chamber as opposed to lower in the biofilm-aeration chamber. The configuration will also result in the appropriate particle size reduction, high DO and fluid flow.

Still another alternative embodiment occurs using an angled hollow tube in which a shaft ending in a propeller/blade is rapidly spinning. Again air will be drawn down the hollow tube to be mixed with the wastewater being treated thereby aerating the wastewater creating the requisite fluid flow, and mixing/particle size reduction as previously described.

Yet another alternative embodiment involves use of a venturi pump in the biofilm aeration chamber, attached to an external source of pressurized air or the ambient air. Pressure differential created by the venturi pump draws air down an air tube to the pump where it is mixed with the wastewater being treated. The pump and air creates the requisite fluid flow in the biofilm-aeration chamber to circulate wastewater through the biofilm support structure.

In a preferred embodiment, the biofilm is grown from microorganisms present in the wastewater to be treated and the air. In alternative embodiments, specific types of microorganisms may be introduced into the biofilm aeration chamber to form biofilms of different compositions. For example, FR Patent No. 2612-915-A describes the biological treatment of di-ethanolamine-containing wastes using a biocoenosis of Pseudomonas and Bacillus microorganisms. (Rittman 1987, describes the growth of different classes of microorganisms depending on the DO concentration. See page 132.) Thus a greater variety of microorganisms may be utilized with the present invention.

In an alternative embodiment, additional compounds may be added to the mixed liquor prior to or during treatment. Such compounds may be: chelating agents; buffering agents in the case of mixed liquor of a pH incompatible with the biofilm; surface active agents which affect the particle size of the MLSS in the mixed liquor or affect the oxygen transfer or the particle/biofilm interaction; enzymes to enzymatically break down particles or components of the wastewater; chemical compounds as needed for treatment; and any other compounds useful in either the treatment of the mixed liquor or in downstream processing of the treated water.

In another embodiment, nutrients such as iron and other compounds are added to the mixed liquor to increase the growth and viability of the biofilm or alter its composition.

ADVANTAGES OF THE PRESENT INVENTION

The present invention results in the following advantages over conventional municipal wastewater treatment:

1. The MLSS concentration is very low.

Under normal conditions, the MLSS concentration in conventional submerged biofilm processes is between a one hundred and five thousand mg/l. This results in large amounts of sludge. Under normal operating conditions, the average MLSS concentration in a plant using the present invention is less than 18 mg/l. This low MLSS concentration provides extremely low solids in the settling chamber. Sludge buildup in the biofilm-aeration chamber and settling chamber is prevented. This is an extremely important aspect of the present invention since sludge disposal is very expensive in both monetary and environmental terms. Further, in plants where the discharge limit of suspended solids is less than 30 mg/l (i.e. NSF Class 1 Standard and EPA "Secondary Treatment Standard" for wastewater treatment plants), the secondary settling chamber may be eliminated altogether thereby reducing the construction cost of plants.

2. Short biofilm incubation time.

In conventional processes using biofilm, biofilm growth must first be started and is generally observed after approximately three weeks. This lag time is experienced every time the plant is shut down for cleaning of clogged tubes. In the present invention biofilm growth was observed after three days and continued vigorously thereafter; additionally, the treatment of the present invention results no clogging since Jun. 19, 1992 to date and thus virtually eliminates further lag time due to cleaning. This again results in a treatment plant of the present invention remaining in service longer and, should cleaning ever become necessary, the plant returning to full service more rapidly than in conventional processes.

3. Clogging of the system is eliminated.

An additional advantage to the present invention is that the fluid flow in combination with smaller particles controls the thickness of the biofilm growth keeping it at non-clogging thickness. The biofilm grow more densely, thereby giving increased activity in a given surface areas with no clogging. In the two known plants that use submerged biofilm using larger suspended particles, clogging of vertical plastic media occurs on a regular basis due to thicker less dense coating of biofilm. At such time, all processing must be stopped and the plant must be cleaned. However, because of the low MLSS in the present invention, the tight structure of the biofilm, the good fluid circulation of the mixed liquor and the high concentration of dissolved oxygen in a mixed liquor, the biofilm aeration chamber and the plastic biofilm support structure operate without clogging. Therefore plant operation continues on a regular basis with the requirement for cleaning virtually eliminated thereby increasing the overall capacity, cost effectiveness, accompanied by the elimination of redundant or oversized facilities necessary to handle the down time of the waste treatment plant.

4. Robust Response to Shock Loading

Shock loading occurs at times of very high influent flow or high organic concentration. At such time the system is stressed due to a very high throughput rate or high concentrations of suspended organic solids. Because of the low MLSS concentration in the biofilm aeration chamber and the high concentration of biomass and its activity, the qualities of treated wastewater remains high at high organic and volumetric loading was eliminated. Further, recovery time with the present invention after such shock loading. This in turn results in consistently high quality of effluent without periods of unacceptable quality wastewater being discharged from the plant. In one shock loading test the volume of influent was increased 100% over the design load. The effluent quality actually improved in one embodiment of the present invention to values well below the most stringent EPA standards. In a 200% overload test series, results were comfortably below the EPA 30SS/30BOD limits for secondary treatment.

5. High dissolved oxygen (DO) concentration

The aspirator tip which produces tiny bubbles and vigorously and effectively mixes the fluid and reduces particle size produces a high dissolved oxygen concentration in the mixed liquor. Thus the biofilm aeration chamber operates under relatively low MLSS due to vastly superior and efficient biological degradation, extremely low organic concentration and very high DO conditions. The biomass located on the walls of the support media (and indeed on static surfaces throughout the tank) establishes itself rapidly under this favorable environment and processes organic matter and solids with extremely high efficiency in the biofilm-aeration chamber. This characteristic of additional biofilm growth is yet another unique aspect of the present invention. In the 217 days of continuous testing DO concentration in the biofilm aeration chamber was 7.7 mg/l. Due to environmental requirements, EPA requires 6 mg/l of DO or greater before discharge. Where DO is not high enough, the treatment plant must introduce oxygen into the discharged liquid in a separate process. The present invention eliminates the need for this secondary aeration process to raise the level of DO in fluids being discharged. Thus the expensive re-aeration-before-discharge can be eliminated by the present invention.

6. Consistent Effluent Quality

Biofilm that is attached to the tube walls has a good structure and does not become so thick as to block the tubes. This thickness is controlled by the combination of fluid flow through the biofilm support structure and small particulate size of organic matter and adequate aeration for the biofilm growth. However, once a piece of old biofilm sloughs off the wall of the biofilm support structure, it is immediately pulled back into the fluid flow and reduced in size by the mechanical action of the aspirator tip into tiny particles where it will be spread on the biofilm again. This material will then be digested by a new generation of biofilm. Thus the effluent quality is not affected by old biomass solids as it is in less efficient systems.

7. Sludge is Eliminated

In conventional activated sludge treatment systems, the large volume of sludge must be removed from the various treatment tanks periodically and separate large, expensive digesters must be used. Further, MLSS concentration must be constantly monitored and adjustments to the treatment process made. If such monitoring does not occur, inconsistent effluent quality will result. This results in a large volume of sludge being produced by the process. This large volume of sludge must in turn be treated in sludge digestion tanks or sludge holding tanks.

Daily sludge removal is not required in the present invention. The biomass is fixed on the surface of the support media. Because of low MLSS concentration in the biofilm-aeration chamber the amount of sludge produced in the present invention thus far has been non-existent. This result is vastly different from that of conventional processes and is a hallmark of the present invention. Thus the amount of land fill required for sludge disposal from the present invention is eliminated as is the cost of expensive digestors.

8. Ease of Operation and Maintenance

One embodiment of the present invention comprises a high speed electric motor and aspirator as the only moving part. This is employed under very simple conditions without a routine sludge waste a even sludge accumulation, air flow adjustment or secondary settling tanks with surface skimmers. In fact, in view of the test results to date, a settling chamber after the biofilm aeration chamber is not required and therefore, a sludge return system can also be eliminated. Thus the plant is much easier to operate by comparison to plants of similar capacity, another hallmark of the present invention. An alternate embodiment does not even require the aspirator making operations even less complex.

9. Short Detention Time

By virtue of the structure of the biofilm, the increased dissolved oxygen, and the vigorous activity of the biofilm the amount of time necessary for detention of fluids is greatly decreased thereby increasing the total capacity of the plant. Since the present invention works so effectively, the amount of treatment time, or the time the influent is retained in the biofilm aeration tank is greatly reduced. The shorter detention time translates into a greater overall treatment capacity for any given treatment plant, a very significant advantage. This factor has been borne out by test results obtained when the test plant was subjected to a 50% and 100% overloading for extended period of time. This overloading has been going on for 1½ months usually the overloading period is only a few hours! To date, the plant continues to discharge high quality treated effluent notwithstanding this major overloading.

This factor has a direct bearing on the shock loading capability discussed earlier. The short detention time means that the process is working extremely effectively. This in turn means that there is enough effective treatment capacity available to treat the increase in organic matter present during overload periods. Thus the good quality of the effluent in the biofilm aeration chamber allows the effective treatment of influent during the overload periods yet another hallmark of the present invention.

10. Process not Temperature Sensitive

The process of the present invention is not so temperature sensitive as conventional activated sludge processes. During the periods of cold weather, conventional activated sludge processes build up sludge in the treatment tanks. When warm weather comes, as it suddenly can in the Spring, the sludge that has built up in treatment tanks in the cold weather becomes suddenly more active. This phenomenon known as "Spring Turnover" results in a sudden elevation of SS in the effluent due to the inability of the process to handle the increase biochemical activity of the sludge. This effluent quality dramatically decreases during the Spring turnover phenomenon.

The present invention avoids these problems associated with temperature fluctuation. Since no sludge is formed, the Spring turnover phenomenon is eliminated. Since there is a generally low MLSS in the biofilm aeration chamber at all times, pin floc is also eliminated again a hallmark of the present invention.

11. Simplified Plant Design

Since mixed liquor suspended solids concentration is so low in the biofilm aeration chamber, a settling chamber or tank and sludge return system may be eliminated for Class 1 and Class 2 discharge limit/permits. As a result the plant cost will be greatly reduced for the construction of new plants or in the alternative existing plants can be retrofitted with the present invention and increase their capacity thereby reducing the need for new waste treatment facilities. It should be noted that the quality of the wastewater in the biofilm aeration chamber under design loading is always excellent. In fact it is frequently of equal or better quality than the effluent from tertiary treatment processes. Based upon the quality of treatment provided in the biofilm aeration chamber, the pre-treatment chamber may even be eliminated as a first step thereby saving further in construction costs. By having only a biofilm aeration chamber, no pre-treatment chamber, and no settling chamber the wastewater treatment plant design has been immensely simplified.

12. Smaller Plant Size

Since the present invention provides for a more efficient treatment of wastewater, the present invention allows smaller wastewater treatment plants to be built while retaining the same treatment capacity of larger plants utilizing the conventional technology. This factor also goes hand-in-hand with the simplified plant design described (above).

13. Drinking Water Treatment

Due to the improved removal of pollutants and organic solids the present invention may be used as an efficient step for municipal drinking water treatment that will undoubtedly reduce/eliminate other steps in the process. The process is very effective in removing pollutants and easing the subsequent treatment steps for the production of potable water. A key application for this technology would therefore be lesser developed countries whose drinking water lacks appropriate purity.

14. Decreased Energy Consumption

The use of the present invention results in the more efficient use of energy. This is important generally to the more developed countries but is especially important in those countries where electricity or fuels which drive electrical generators is scarce. Treatment plants of the present invention require shorter detention times for effective treatment, and/or little or no tertiary treatment, the total energy necessary to run the treatment plant for extended periods is eliminated as is the requirement for energy resources to run tertiary treatment phases of the wastewater treatment process.

The simplified plant design of the present invention requires a less energy to build operate and maintain and a less land to be occupied.

15. Overall cost effectiveness

The present invention results in an overall cost effectiveness to wastewater treatment. Plants are easier and cheaper to build operate and maintain. They are cheaper to run. They result in better quality effluent requiring little or no tertiary treatment. Facilities using the present invention can meet EPA standards thereby avoiding fines for violating discharge permits. Finally, the overall cost of treating wastewater is greatly diminished on a per gallon basis.

16. Other Disinfection Methods can be used

Ultraviolet (uv) light can be used to treat water. However, turbid wastewater defeats the widespread use of UV since such energy cannot penetrate the water for purification purposes. The effluent of the present invention is extremely clear making penetration of the water and hence the use of UV purification a distinct possibility.

17. Volumetric Insensitivity.

sources of wastewater. The design of the plants is identical to that of FIG. 1 except that wall 15, biofilm support structure 12 and support bar 12a were eliminated. These tests occurred with temperature range of influent of 10° C. to 24° C.

| Test Plant | Test Site | Test Days | Flow (GPD) | BOD (Mg/l) | SS (MG/l) | MLSS (Mg/l) | DO (Mg/l) |
|---|---|---|---|---|---|---|---|
| Jet Aerator/AS | NSF(1990) | 77 | 500 | 35 | 60 | 106 | |
| Jet Aerator/AS | NSF(1990) | 98 | 500 | 33 | 53 | 97 | |
| Jet Aerator/AS | NSF(1991) | 133 | 500 | 45 | 107 | 78 | |
| Jet Aerator/AS | NSF(1992) | 203 | 500 | 37 | 41 | 59 | |

The present invention is relatively insensitive to volumetric changes in the amount of wastewater treated. This advantage is related to shock loading (either a higher or a lower volume) in that more long term changes to the volume of wastewater being treated do not result in any significant changes to the quality of the treated effluent. Indeed during certain tests of up to 100% overload conditions, the quality actually improved over that found in lower capacities. Other test at 200% to overload found the present invention still operating within EPA 30/30 standard for nine days. This translates into the ability of the present invention to handle emergency high volume wastewater treatment while other elements of the wastewater treatment plant are out of commission.

18. BOD Insensitivity

As can be seen from the results the activated sludge plant, after treatment has effluent BOD in the mid 30's to the mid 40's, SS between 41 and 107, and MLSS of 59 to 106. These results far from meet the strictest EPA standards of BOD=10 and SS=10, the U.S. E.P.A. Advanced Treatment Standard and do not even meet the less stringent EPA 30BOD/30SS Secondary Treatment Standard.

EXAMPLE TWO

Following are results of a comparison of various embodiments of the present invention. Blower-biofilm, aerator-biofilm, blower-mixer biofilm and surface aerator biofilm are all compared at the same design loadings of 500 GPD. Configurations of these plants are shown in FIGS. 7–10. These tests took place near Cleveland, Ohio and encompassed a wide temperature range (12° c.–20° c.) at the design loading of the plant (i.e. 500 GPD). The NSF test refers to the Testing done at the National Sanitation Foundation, an industry certification organization in Michigan.

| Test Plant | Test Site | Test Days | Flow (GPD) | BOD (Mg/l) | SS (MG/l) | MLSS (Mg/l) | DO (Mg/l) |
|---|---|---|---|---|---|---|---|
| Blower/Biofilm | Geauga | 95 | 500 | 10 | 11 | 13 | 6 |
| Blower + Mixer/Biofilm | Geauga | 95 | 500 | 12 | 13 | 22 | 6.1 |
| Jet Aerator/Biofilm | Geauga | 95 | 500 | 11 | 11 | 17 | 8.1 |
| Surface Aerator/Biofilm | Geauga | 95 | 500 | 9 | 8 | 14 | 8.2 |
| Jet Aerator/Biofilm | NSF | 210 | 500 | 15 | 12 | 18 | 7.6 |

Just as the system is insensitive to higher loadings, so it is insensitive to upward fluctuations in BOD. The activity of the biofilm is such that it is capable of treating wastewater having a wide range of BOD yet still achieve good quality effluent results.

EXAMPLES

The examples and test results which follow are all based upon the exact same treatment plant design. All treatment tanks are the same size and configuration both internally and externally. They all have the same 500 GPD design capacity and holding capacity. In short, all results which follow are as closely related as possible except for the embodiment of the present invention used, or in the case of the activated sludge process, the baseline process employed.

EXAMPLE ONE

The table listed below shows a five hundred gallon per day test of an activated sludge plant (AS), using an aerator and no biofilm. These plants were all the same size and configuration as one another and use the same influent These results show the improvement to be gained by the present invention over that of activated sludge and the temperature insensitivity of the present invention. BOD and SS are all low and DO is high making further tertiary aeration unnecessary. Results meet or are close to meeting the EPA 0/0 standard and comfortably meet the EPA 30/30 standard.

EXAMPLE THREE

The table below shows the results of two embodiments of the present invention; one with an aspirator (FIG. 9) and one without (FIG. 7) both employing stationary submerged biofilm and both at flow rates of 750 GPD i.e. 50% above the design capacity of 50 GPD). Again plant designs are identical to the activated sludge control group except for the modifications of the present invention. The test took place with influent temperatures ranging from 9° C. to 14° C.

| Test Plant | Test Site | Test Days | Flow (GPD) | BOD (Mg/l) | SS (MG/l) | MLSS (Mg/l) | DO (Mg/l) |
|---|---|---|---|---|---|---|---|
| Blower/Biofilm | Geauga(1992) | 32 | 750 | 9 | 7 | 440 | 5 |
| Jet Aerator/Biofilm | Geauga(1992) | 32 | 750 | 14 | 11 | 19 | 8.5 |

As can be seen the two embodiments of the present invention have BOD and SS values well below the activated sludge process and below or near the EPA 10/10 standards for advanced treatment. The superior capability of the present invention is evident.

EXAMPLE FOUR

The table below shows the results from testing two of the alternate embodiments of the present invention: the surface aeration with biofilm mode and the blower-biofilm embodiments both at the flow rates of 1000 GPD (i.e. 100% above the design capacity of 500 GPD). Again plant designs are identical to the activated sludge control group except for modifications of the present invention.

| Test Plant | Test Site | Test Days | Flow (GPD) | BOD (Mg/l) | SS (MG/l) | MLSS (Mg/l) | DO (Mg/l) |
|---|---|---|---|---|---|---|---|
| Blower/Biofilm | Geauga(1993) | 32 | 1000 | 19 | 17 | 18 | 5.9 |
| Jet Aerator/Biofilm | Geauga(1993) | 41 | 1000 | 6 | 6 | 6 | 9.7 |

As can be seen from these results, the surface aeration with biofilm mode gives results which are superior to the blower biofilm embodiment. Both processes gave results superior to the activated sludge process at a much lower loadings comfortable below the EPA 30SS/30BOD standard.

EXAMPLE FIVE

The table below shows the results of the Jet aerator/biofilm embodiment of the present invention (FIG. 9) at a 200% overload (1500 GPD) for eight day period at the NSF facility in Michigan in January, 1993 (i.e. low influent temperature).

| Test Plant | Test Site | Test Days | Flow (GPD) | BOD (Mg/l) | SS (MG/l) | MLSS (Mg/l) | DO (Mg/l) |
|---|---|---|---|---|---|---|---|
| Jet Aerator/Biofilm | NSF | 8 | 1500 GPD | 21 | 22 | 24 | 9.9 |

Again, the present invention produced effluent quality sufficient to meet EPA 30/30 standards. This 8 day period would be enough to handle a vast majority of emergencies where such a large overload condition would exist (i.e. equipment breakdown in other parts of a waste treatment plant.

SUMMARY

A highly efficient wastewater treatment process and apparatus have been disclosed. Many variations and modifications of the present invention as set forth will occur to those skilled in the art. It is intended in the claims that follow to encompass all such modifications as variations as may fall within the spirit and scope of the invention as disclosed.

I claim:

1. A biofilm-aeration plant for treating wastewater comprising:

a) a pre-treatment chamber wherein organic and inorganic solids are settled out of solution; and b) a biofilm-aeration chamber, connected to the pre-treatment chamber and adapted to degrade organics and digest mixed liquor suspended solids, comprising an aerator, means for reducing the particle size of the suspended solids and dissolved organic matter, a stationary biofilm support structure submerged in the mixed liquor of the biofilm-aeration chamber, and biofilm growing on the submerged stationary biofilm support structure;

c) the aerator comprising a spinning subsurface aspirator adapted to cause a pressure differential to exist between the aspirator tip arm apertures and ambient air such that ambient air is drawn into the subsurface aspirator and expelled into the mixed liquor through the subsurface aspirator, the subsurface aspirator comprising a hollow aspirator tip, the aspirator tip comprising a hollow core, hollow arms protruding radially from the hollow core, and apertures at the tip of each hollow arm.

2. The plant according to claim 1 further comprising a settling chamber wherein remaining solids and biofilm settle out of solution prior to the treated wastewater being discharged from treatment, the settling chamber comprising an inlet port and an outlet port, the inlet port being connected to the biofilm-aeration chamber and the outlet port adapted to discharge treated wastewater from the settling chamber.

3. The plant according to claim 1 wherein the biofilm support structure comprises tubes having apertures with a cross section shape, the cross section shape selected from the group consisting of square, rectangular, circular, oval, triangular, octagonal, hexagonal, and parallel plane surfaces.

4. The plant according to claim 1 wherein the biofilm support structure and associated biofilm are stationary and completely submerged in the mixed liquor of the biofilm aeration chamber.

5. A biofilm-aeration plant for treating wastewater comprising:

a pre-treatment chamber wherein organic and inorganic solids are settled out of solution; and b) a biofilm-aeration chamber, connected to the pre-treatment chamber and adapted to degrade organics and digest mixed liquor suspended solids, comprising an aerator, means for reducing the particle size of the suspended solids and dissolved organic matter, a stationary biofilm support structure submerged in the mixed liquor of the biofilm-aeration chamber, and biofilm growing on the submerged stationary biofilm support structure;

c) the aerator comprising a venturi pump, the venturi pump comprising a tube connected to the pump and exiting the biofilm aeration chamber at the top of the chamber such that the tube is in fluid communication with ambient air and such that the action of the venturi pump causes a pressure differential which draws air down the tube to the venturi pump to be mixed with the wastewater being treated, creating a circulation in the mixed liquor sufficient to flow the mixed liquor through the biofilm support structure.

6. A biofilm-aeration plant for treating wastewater comprising:

a) a pre-treatment chamber wherein organic and inorganic solids are settled out of solution; and b) a biofilm-aeration chamber, connected to the pre-treatment chamber and adapted to degrade organics and digest mixed liquor suspended solids, comprising an aerator, means for reducing the particle size of the suspended solids and dissolved organic matter, a stationary biofilm support structure submerged in the mixed liquor of the biofilm-aeration chamber, and biofilm growing on the submerged stationary biofilm support structure;

c) the aerator comprising a hollow tube connected to a spinning propeller adapted to draw air down the tube to be expelled into the wastewater being treated to aerate and mix the wastewater.

7. The plant of claim 6 further comprising a submerged rotating blade adapted to reduce the size of solid particles suspended in the mixed liquor.

8. A biofilm-aeration plant for treating wastewater comprising:

a) a pre-treatment chamber wherein organic and inorganic solids are settled out of solution; and b) a biofilm-aeration chamber, connected to the pre-treatment chamber and adapted to degrade organics and digest mixed liquor suspended solids, comprising an aerator, means for reducing the particle size of the suspended solids and dissolved organic matter, a stationary biofilm support structure submerged in the mixed liquor of the biofilm-aeration chamber, and biofilm growing on the submerged stationary biofilm support structure;

c) the means for reducing particle size of the suspended solids and dissolved organic matter comprising an aspirator tip, the aspirator tip comprising a central body and arms protruding radially from the central body, the aspirator tip adapted to rotate at a speed sufficient to reduce the particle size of suspended solids and dissolved organic matter in the mixed liquor.

9. The plant according to claim 8 wherein the aerator comprises at least one submerged air pipe adapted to accept pumped compressed air, and at least one tubular diffuser connected to the air pipe, the diffuser having at least one hole adapted to allow the compressed air to be forced into the mixed liquor.

10. The plant according to claim 9, further comprising at least one submerged rotating blade adapted to reduce the size of solid particles suspended in the mixed liquor.

11. The plant according to claims 1, 5, 6, or 8 wherein the biofilm support structure occupies between about 10 and about 99 percent of the total volume of the biofilm-aeration chamber.

12. The plant according to claims 1, 5, 6, or 8 wherein the particle size reduction means is located proximate the surface of the wastewater being treated.

13. The plant according to claims 5, 5, 6, or 8 wherein the particle size reduction means is located at least as high as the bottom of the biofilm support structure.

* * * * *